United States Patent
Desmarais et al.

(10) Patent No.: US 12,010,228 B2
(45) Date of Patent: Jun. 11, 2024

(54) SYSTEMS, METHODS, AND DEVICES FOR SECURE BLOCKCHAIN TRANSACTION AND SUBNETWORKS

(71) Applicant: Kelvin Zero Inc., Montréal (CA)

(72) Inventors: Philippe Desmarais, Montréal (CA); Thierry St-Jacques-Gagnon, Montréal (CA)

(73) Assignee: Kelvin Zero Inc., Montreal (CA)

( * ) Notice: Subject to any disclaimer, the term of this patent is extended or adjusted under 35 U.S.C. 154(b) by 662 days.

(21) Appl. No.: 17/049,982

(22) PCT Filed: Mar. 27, 2019

(86) PCT No.: PCT/CA2019/050376
§ 371 (c)(1),
(2) Date: Oct. 23, 2020

(87) PCT Pub. No.: WO2019/218055
PCT Pub. Date: Nov. 21, 2019

(65) Prior Publication Data
US 2021/0083872 A1     Mar. 18, 2021

Related U.S. Application Data

(60) Provisional application No. 62/671,550, filed on May 15, 2018.

(51) Int. Cl.
*H04L 9/08*      (2006.01)
*G06Q 20/36*   (2012.01)
(Continued)

(52) U.S. Cl.
CPC ....... *H04L 9/0894* (2013.01); *G06Q 20/3674* (2013.01); *G06Q 20/3825* (2013.01);
(Continued)

(58) Field of Classification Search
CPC ... H04L 9/0894; H04L 9/0825; H04L 9/3255; G06Q 20/3674; G06Q 20/3825
See application file for complete search history.

(56) References Cited

U.S. PATENT DOCUMENTS 6,202,153 B1 * 3/2001 Diamant ................. H04L 63/04
726/35
9,892,460 B1   2/2018 Winklevoss et al.
(Continued)

FOREIGN PATENT DOCUMENTS

JP        H11232348 A    8/1999
WO     2017145021 A1    8/2017

OTHER PUBLICATIONS

CIPO as ISA, International Search Report and Written Opinion for PCT/CA2019/050376, May 28, 2019.
(Continued)

*Primary Examiner* — Tae K Kim
(74) *Attorney, Agent, or Firm* — Own Innovation; James W. Hinton

(57) ABSTRACT

Provided herein is a system, device, method, and subnetwork for performing a secure blockchain transaction of a digital asset. The system includes a terminal for generating the blockchain transaction, the terminal configured to operate in a first mode and a second mode, and a switch connector for preventing the terminal from operating in the first mode and the second mode simultaneously. When the terminal is in the first mode, the terminal is connected via a network to a system provider server, the system provider server in communication with a plurality of blockchain devices. When the terminal is in the second mode, the terminal is in communication with a cold storage device. The cold storage device is configured to store a private key for signing the blockchain transaction. The terminal is
(Continued)

configured to sign the blockchain transaction on the cold storage device using the private key.

22 Claims, 20 Drawing Sheets

(51) Int. Cl.
  *G06Q 20/38*  (2012.01)
  *H04L 9/00*  (2022.01)
  *H04L 9/32*  (2006.01)

(52) U.S. Cl.
  CPC .......... *H04L 9/0825* (2013.01); *H04L 9/3255* (2013.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 2002/0133717 | A1 | 9/2002 | Ciongoli et al. |
| 2015/0262137 | A1 | 9/2015 | Armstrong |
| 2015/0324789 | A1 | 11/2015 | Dvorak et al. |
| 2016/0292680 | A1* | 10/2016 | Wilson, Jr. ............. G06Q 40/06 |
| 2017/0180134 | A1 | 6/2017 | King et al. |
| 2017/0206523 | A1 | 7/2017 | Goeringer et al. |
| 2017/0270492 | A1 | 9/2017 | Donovan et al. |
| 2018/0176013 | A1* | 6/2018 | Cheng ..................... G06F 21/64 |
| 2018/0189778 | A1* | 7/2018 | Grassadonia .......... G06Q 20/08 |
| 2018/0216946 | A1* | 8/2018 | Gueye ................ G01C 21/3617 |
| 2018/0240107 | A1* | 8/2018 | Andrade .............. G06Q 20/065 |
| 2018/0262341 | A1* | 9/2018 | Cheng ..................... G06F 21/86 |
| 2018/0341648 | A1* | 11/2018 | Kakavand ................. H04L 9/40 |
| 2019/0260574 | A1* | 8/2019 | Shi .......................... H04L 63/00 |
| 2019/0318356 | A1* | 10/2019 | Martin .................. H04L 9/0637 |
| 2019/0332691 | A1* | 10/2019 | Beadles ............. G06Q 20/3829 |

OTHER PUBLICATIONS

CIPO as ISA, International Search Report and Written Opinion for PCT/CA2019/050376, dated May 28, 2019.

Arvind Narayanan et al., "Textbook of Virtual Currency—How Virtual Currencies such as Bitcoin work", Nikkei BP, Dec. 9, 2016, 1st edition, ISBN978-4-8222-8545-6, pp. 159-166.

Japanese Patent Office, Notification of Reasons for Refusal for JP Patent App. No. 2020-564675, dated Jan. 4, 2022.

United Arab Emirates Ministry of Economy, Search Report for AE Patent App. No. P6001594/2020, Dec. 18, 2023.

\* cited by examiner

FIG. 12

Create Invoice — 1204
Payee/Recipient's address — 1208
Payer's account — 1212

Amount
$ 1
1216

Transaction Fee
0.03
1218

Total
1.03
1224

Submit — 1228

1200

SYSTEMS, METHODS, AND DEVICES FOR SECURE BLOCKCHAIN TRANSACTION AND SUBNETWORKS

TECHNICAL FIELD

The following relates generally to blockchain technologies, and more specifically to computer systems, methods, and devices for making secure blockchain transactions.

INTRODUCTION

As use of blockchain technologies becomes more prevalent, greater attention is brought to computer security issues when dealing with transactions involving blockchain assets. For example, there have been publicized cases of thefts of blockchain assets (e.g., cryptocurrencies) and hacking of servers of blockchain wallet providers and/or exchanges. Fifty one percent (51%) attacks are another threat to the blockchain landscape. As the value and importance of blockchain assets increases and adoption is mainstreamed, individuals or organizations may want to store blockchain assets out of reach of hackers and mitigate the risk of other kind of attacks targeting the blockchain ecosystem itself. Furthermore, as more critical infrastructure systems are looking forward to blockchain usage and implementations, the importance of building this next generation of systems with security in mind can only become a top priority.

Blockchain assets can include any one or more of cryptocurrencies (such as Bitcoin™), stocks of a company or shares in any other type of assets, financial products (e.g., bonds, debt securities, options, futures and other derivatives), stored data of various types (i.e. a document, records, logs, etc.), proof of identity, travel or government documents, licenses, and an interest in a smart contractual agreement. These assets are characterized as being transacted using blockchain technologies. Blockchain technologies include a distributed ledger performed by various computers independently checking the integrity of transactions in a decentralized way.

For example, among the various ways of managing blockchain wallets and assets, it is possible to use a "hot" wallet. A hot wallet is an online portal, typically tied to an account, through which transactions can be initiated and blockchain assets are stored and accessed. Since it is usually a website, it is highly practical. However, convenience and security are often conflictual, as it is the case in this situation. Hence another wallet (usually an electronic file) can be stored on a "cold storage" which is not online and which is used as a "safe" where it is possible to store seldom traded blockchain assets, or blockchain assets that will not be traded in the near future. This cold storage is similar to a safe or a savings account and may offer security parameters.

Since a wallet "containing" blockchain assets (e.g. cryptocurrencies) is a support (which may be physical, digital or otherwise) that stores and allows for the representation of at a minimum one key, managing such a support needs to be done carefully. The process of managing wallets "containing" blockchain assets may include safe storage, encryption, duplication, back-ups, Create-Update-Read-Delete (CRUD) operations, distribution, access, recovery mechanisms, and the like.

Currently, most blockchain technologies are used, accessed, or operated on over a traditional computer or smartphone. This leaves users with a risk from security issues arising from the attack surfaces offered by these devices. The convenience of the different services found on these devices paired with the complexity of properly securing them makes it hard for users to adopt best operation security practices for blockchain technologies. Adding to this is a lack of clear public documentation detailing security features and the process of implementation of such features and most end-users find themselves in a situation where best practices are far from ideal practices.

Furthermore, blockchain assets can be difficult to access since blockchain technologies are complex and difficult to operate in comparison to regular payment or record keeping solutions, for instance. This difficulty in operating the blockchain system can present multiple opportunities to compromise user data. Negative consequences, including loss of the blockchain asset, can result if data is not properly handled and secured.

Currently, a user who wants to trade blockchain assets (e.g., cryptocurrencies or other asset such as digital assets or tangible assets traded on a blockchain without typical tokenization) has two options. The user can trade and store the cryptocurrencies on a web-based exchange or wallet provider and hope that the exchange or wallet provider is not compromised. The user must also avoid the compromising of his own set of credentials accessing the web portal. Otherwise, the user can use a cold storage device or software to store their private keys offline. By storing offline, the user protects itself from hot storage (e.g. web account/servers) compromise. Non-hot storage solutions can be difficult to implement and require considerable effort to set up and execute a trade of a blockchain asset. In some cases, the user can use a combination of the two options.

This approach is not particularly secure since malware can be introduced at multiple stages of the process. Malware can be delivered to the cold storage device, or on other components of the transit path taken by the key; for example, the internet-connected computer used to broadcast the transaction may be a target if that device is used for signing the transaction using the unencrypted (or temporarily decrypted) private key from the cold storage device. This approach also ignores the creation of efficient and reliable back-up strategies and plans, implementation of a recovery solution in case of loss or destruction of all back-up copies kept by the user, and establishment of secure methods for storing and using the recovery solution.

The wallet often takes the form of an encrypted file stored on a cold storage device. When digital assets associated with the stored wallet need to be accessed (for example, to make a transaction), the cold storage device may be connected to an internet-connected computer and/or the wallet is transferred manually to that device. The encrypted wallet file is then decrypted (if encryption is used) and unlocked to be used to sign a transaction that will transfer the digital assets to a specific public address. However, in this scenario the main issue is the cold storage device is connected in some way to a non-cold device, which may be via USB and other unsecure transitory means, and passes on the private key in an unencrypted format for the transaction to be signed before being handed back to that non-cold device. After signing, the unencrypted private key is removed as quickly as possible from the internet-connected device, but code can easily retrieve this content even if left in memory for a few CPU cycles.

Accordingly, there is a need for improved systems, methods, and devices for performing secure blockchain transactions.

SUMMARY

The following relates generally to blockchain technologies, and more specifically to computer systems, methods, and sub-networks for making secure blockchain transactions, while allowing current or future compliance requirements and various policies.

There is provided a system for performing a secure blockchain transaction of a digital asset. The system includes a terminal for generating the blockchain transaction. The terminal is configured to operate in a first mode and a second mode. The system includes a switch connector for preventing the terminal from operating in the first mode and the second mode simultaneously. When the terminal is in the first mode, the terminal is connected via a network to a system provider server. The system provider server is in communication with a plurality of blockchain devices. When the terminal is in the second mode, the terminal is in communication with a cold storage device. The cold storage device is configured to store a private key (and derived keys) for signing the blockchain transaction. The terminal is configured to allow the signature of the blockchain transaction on the cold storage device using the appropriate private key.

The switch connector may include a hardware switch.

The switch connector may include a software switch.

The signed transaction may be signed by at least one other party prior to sending the signed blockchain transaction to the blockchain devices.

Other parties may include a system provider.

The system provider server may be in communication with at least one service provider device.

A terminal for performing a secure blockchain transaction of a digital asset is provided herein. The terminal includes a processor for generating an unsigned blockchain transaction. The terminal includes a cold storage communication port for transmitting the unsigned blockchain transaction to a cold storage device. The cold storage device stores a private key for signing the unsigned blockchain transaction. The terminal receives a signed blockchain transaction from the cold storage device. The terminal includes a network communication port or mechanism for transmitting the signed blockchain transaction to a system provider server. The system provider server is in communication with a plurality of blockchain devices. The terminal includes a switch connector for selectively disabling either the cold storage communication port or the network communication port such that the private key is not exposed to the network.

The switch connector may include a hardware switch.

The switch connector may include a software switch.

The terminal may be further configured to restrict inbound and outbound communication with the system provider server.

A cold storage device for performing a secure blockchain transaction of a digital asset over a network is provided herein. The cold storage device includes a memory storing a cold wallet. The cold wallet includes a private key for signing an unsigned blockchain transaction. The cold storage device includes a communication interface for receiving an unsigned blockchain transaction from a terminal when the terminal disconnected from the network. The communication interface transmits a signed blockchain transaction to the terminal when the terminal is disconnected from the network. The cold storage device includes a processor capable of handling connections to other processors. The processor is configured to generate the signed blockchain transaction by signing the unsigned blockchain transaction using the private key.

The communication interface may use at least one communication mechanism selected from the group consisting of encrypted Bluetooth, near-field communication, Wi-Fi, optical communication, wired communication, and thermal emission.

The processor may be further configured to generate the cold storage wallet.

The processor may be further configured at the generation of the cold storage wallet.

The cold storage wallet may be a hierarchical deterministic wallet.

The cold wallet may be a multi-signature wallet.

The multi-signature wallet may require the signature of at least two parties.

A method of performing a secure blockchain transaction of a digital asset over a communication network is provided herein. The method includes generating an unsigned blockchain transaction using a terminal, the terminal having an online mode and an offline mode. The method includes transmitting, in the offline mode, the unsigned blockchain transaction from the terminal to a cold storage device, the cold storage device storing a private key for signing the unsigned blockchain transaction. The method includes signing the unsigned blockchain transaction on the cold storage device using the private key. The method includes transmitting the signed blockchain transaction from the cold storage device to the terminal. The method includes switching the terminal from the offline mode to the online mode. The method includes transmitting the signed blockchain transaction from the terminal to a system provider server via the communication network while in the online mode. The system provider server is in communication with a plurality of blockchain computers.

The method may include signing the transmitted signed transaction with a second private key according to a multi-signature authentication process.

Signing the transmitted signed transaction may be performed on the system provider server.

The switching may be performed using a switch connector.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 12 is a graphical interface of a system for performing secure blockchain transactions, according to an embodiment;

DETAILED DESCRIPTION

Figure 1:
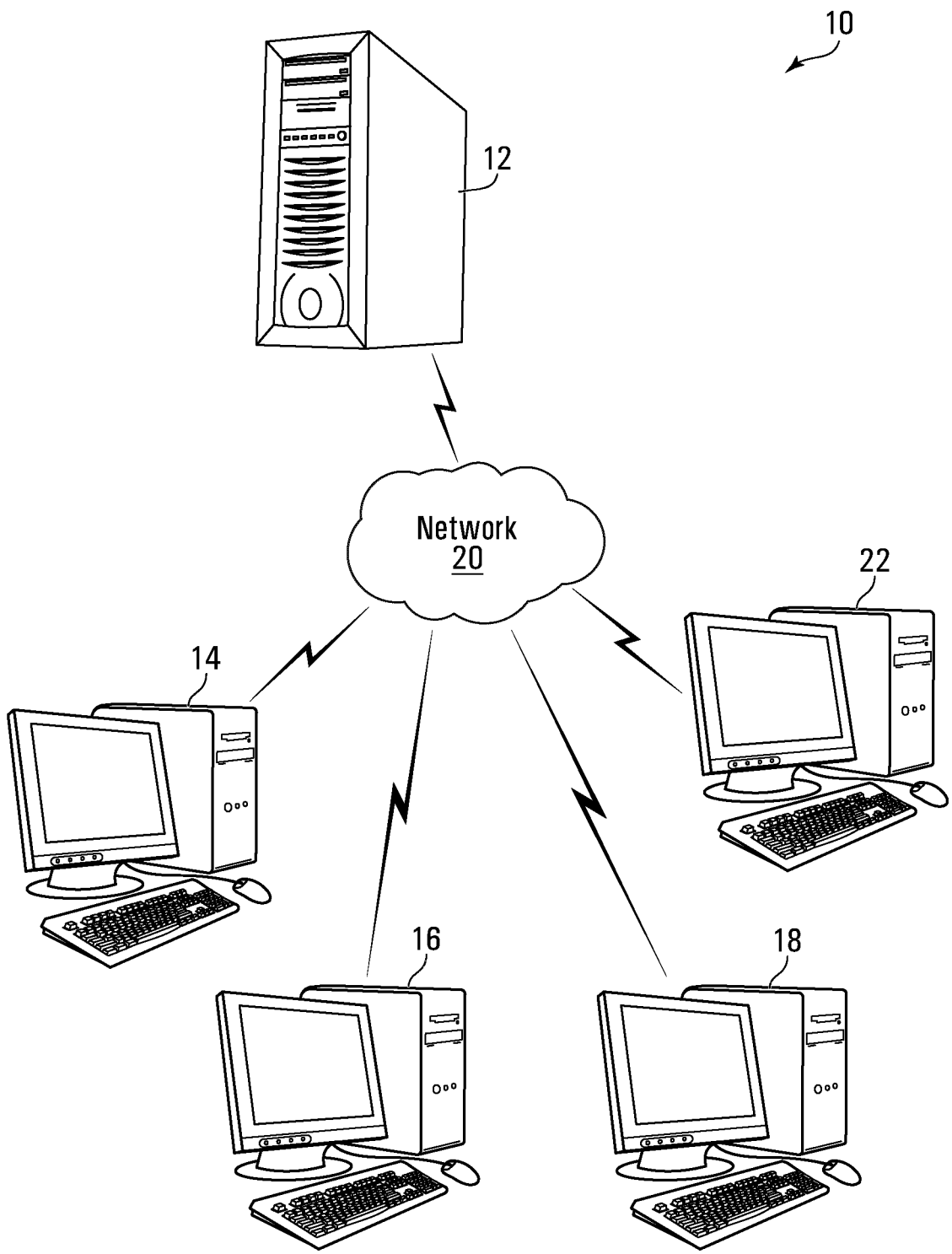
FIG. 1 is a schematic diagram of a system for performing secure blockchain transaction of a digital asset, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, tablet device, smart card, banking card or identification card.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Furthermore, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to blockchain technologies, and more specifically to computer systems, methods, and devices for making secure, compliant blockchain transactions, while allowing for various external policies and regulations to coexist in the blockchain environment. The present disclosure also relates to subnetworks for the computer systems, methods, and devices for making the secure, compliant blockchain transactions.

The following describes a system for performing secure blockchain transactions/operations. Blockchain operations may include accessing, trading, exchanging, sending, receiving, updating, and using assets managed with blockchain technologies. For example, the system can be used to transact, transfer, and manage a blockchain asset.

Assets managed with blockchain technologies may be referred to throughout the present disclosure as "blockchain assets", "assets", or "digital assets" and are understood to include any asset capable of being managed or transacted using blockchain technologies.

Blockchain assets may include cryptocurrencies (such as Bitcoin™), stocks of a company or shares in any other type of project, financial products (e.g. bonds, debt securities, options, futures and other derivatives), stored data of various types (e.g. a document, records, etc.), or any interest in a smart contractual agreement ("smart contract"). The blockchain asset may be a digital asset. The blockchain asset may be a tangible asset that is blockchained without typical tokenization. Blockchain assets are characterized as being transacted using blockchain technologies; that is, using a distributed ledger performed by various computers independently checking the integrity of transactions in a decentralized way.

Blockchain assets are a type of digital asset, including but not limited to cryptocurrencies, and sometimes represent stakes in a particular project or company. The blockchain asset may be a tangible asset that is blockchained without typical tokenization. Others are intended solely as currencies (e.g. Bitcoin) and do not represent a stake in a particular organization. However, unlike traditional assets, blockchain assets are digital, owned solely by the cryptographically allowed signee(s) of a given address, and are immediately transferable, at any time, to other addresses.

A blockchain asset may include a natively digital asset like Bitcoin or a digitized traditional asset like digital gold, a stock or a title, a document or records, logs, or journal and even processes or supply chains; where the record of ownership, permission to use, responsibility or action taken is recorded within a public or permissioned distributed ledger network.

Cryptocurrency may include a subset called Crypto tokens. Tokens may represent an asset or utility. A crypto token may represent other cryptocurrency, like one such token being equal to a given number of bitcoins on a particular blockchain. Crypto tokens are tradable and transferrable among the various participants of the blockchain. Such crypto tokens often serve as the transaction units on the blockchains that are created using the standard templates (e.g. Ethereum network and ERC-20 Tokens) that allows a user to create their own tokens. Such blockchains work on the concept of smart contracts or decentralized applications, where the programmable, self-executing code is used to process and manage the various transactions occurring on the blockchain. Cryptocurrencies and altcoins are specific virtual currencies that have their own dedicated blockchains and are primarily used as a medium for digital payments. Crypto tokens operate on top of a blockchain that acts as a medium for creation and execution of decentralized apps and smart contracts, and the tokens are used to facilitate the transactions.

The blockchain asset may be a document, certificate, record, license, degree, or any data. A blockchain document requires permissions to be viewed, sent, shared, or modified. The permission may be granted via the permissions within a trusted group or by sending the document to a specific address (recipient) that would then obtain the rights to, for example, view it, read it or share it. Also, the blockchain document itself can not be altered without creating a new version on the blockchain, typically attaching the hash of the modified document to prove integrity has been changed.

The systems of the present disclosure may implement and enforce best practices in blockchain Operations Security ("OpSec"), while making it easier and more convenient for a user compared to typical cold storage methods used by current blockchain users. The systems, methods, and devices of the present disclosure may improve ease of use (including ease of access to the assets) and security, making blockchain technologies more accessible to institutions and the non-crypto savvy public, including individuals and enterprises, while surpassing general security measures taken by current blockchain enthusiasts.

Generally, in the systems and methods of the present disclosure, a blockchain transaction is initiated on a terminal. The terminal requests the creation of the blockchain transaction to a system provider server. The request is sent from the terminal to the system provider server via a secure communication channel such as TLS, IPsec, Point-to-Point Tunneling, or the like. The system provider [server] then sends the transaction, in parallel, to the requesting terminal, a service provider server, and a system provider cold storage. An extra step to make the appropriate verifications and apply business logic and/or rules can then be conducted on the Terminal, the cold storage devices of all entities involved, or on all of these components, and eventually approves the transaction by allowing the cold storage devices to sign it.

In some embodiments, this may be abstracted by the service provider playing an intermediary role if such behavior is desired. For example, the end-user may connect, via the terminal, to a service provider server to better integrate with the service/product/solution provided by the service provider. The Service Provider then relays the information via a query or sends the request to the system provider (i.e. using a provided API, proprietary protocol, Remote Procedure Calls or other mechanisms). This process is also conducted via a secure communication channel.

The transaction signing process, including the passing of the unsigned and signed transaction between the terminal and the cold storage typically follows this process.

In one embodiment, the transaction is pulled from the terminal by the cold storage, ensuring the control rests within the most data sensitive device and its owner (the cold storage containing the private keys).

In another embodiment, the terminal temporarily unicasts, multicasts, or broadcasts the unsigned transaction, allowing the cold storage device to capture it on the directive of the user. The exchange may be done via hardware or wired connections, wirelessly, including but not limited to technologies such as, light emitting or optical data transfers, QR/bar code scanning, IR transmission, Radio Frequencies, Electromagnetic emissions, or the like.

The communications between the terminal and the cold storage within enterprise environments or at a service provider facility or system provider facility may use non-physically connected technologies for the passing of the unsigned transaction (inbound data transfer) and a highly secure unidirectional data diode system for the exchange of the partially signed transaction (outbound data transfer). This may advantageously limit the usage of these technologies for potential data exfiltration and other nefarious purposes as well as implement sound and secure, physically proven, one-way transfers, allowing for the implementation of strict data loss prevention policies and protocols. Human intervention may be added in these environments if desired and/or required.

Once the unsigned transaction is sent to the cold storage, the transaction is then reviewed on the device to ensure the validity of the transaction, mitigating data input mistakes and any malicious attempts at manipulating the transaction before it is cryptographically approved.

If satisfied by the transaction details, the end-user device decrypts and unlocks the end-user private key by authenticating the identity of the end user. This may include any combination of a PIN, a passphrase, biometrics data or any other compliant authentication mechanism. This allows the private key to sign the transaction as required, before self-encrypting again as soon as the key is not needed anymore.

The signed transaction is transmitted back to the terminal from the cold storage device. Using the systems of the present disclosure, a private key for signing a transaction is only ever decrypted on the cold storage device in an isolated and secure cryptographic module and is not in contact with anything else. This is a first layer of security of the system.

The present disclosure provides methods for secure blockchain transaction wherein the approval of the signature by each party is based on a set of business logic, compliance standards, protocols and rules.

The present disclosure provides a method a secure blockchain transaction that may mitigate the risk of loss, theft, destruction of an end-user wallet by distributing shares of the secret of the seed to various parties involved in the multi-signature account without the possibility of one party unilaterally taking over. Using the method, the wallet may be effectively recovered and transferred on a new device.

The present disclosure provides a method of secure blockchain transaction that may reduce the risk of accepting transactions with a low confirmation count on the blockchain, which may effectively reduce the time for further usage, with the ability to reprocess the transaction if never accepted on the blockchain network.

The present disclosure provides a method for secure blockchain transaction that may reduce the effects of 51% attacks, allowing for a continuous usage of the blockchain amongst the subnetwork, reconciliating the transactions once the 51% attack is stopped.

Referring now to FIG. 1, shown therein is a block diagram illustrating a system 10, in accordance with an embodiment. The system 10 includes a terminal 12 which communicates with a System Provider infrastructure 14, and/or a service provider infrastructure 16 via a network 20. The terminal 12 can also communicate with a plurality of cold storage devices 18. The system provider infrastructure 14 communicates with a plurality of blockchain infrastructure 22 via the network 20 (such as the Internet) or any other network. The network 20 may be a wired or wireless network. The terminal 12 may be a purpose-built machine designed specifically for authenticating an end-user and allowing the end user to initiate secure blockchain transactions. To this end, the terminal 12 plays a role as an interface between the System Provider and a system provider cold storage.

The terminal 12 may act as a multiplexer, router and/or distributor between involved parties.

The terminal 12, system provider infrastructure 14, service provider infrastructure 16, cold storage devices 18 and blockchain infrastructure 22 may be a server computer, desktop computer, notebook computer, tablet, PDA, smartphone, smart card, bank card or another computing device. The devices 12, 14, 16, 18, 22 may include a connection with the network 20 such as a wired or wireless connection to a network such as the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM), read-only memory (ROM), or similar types of memory. Also, memory may store one or more applications for execution by processor. Applications may correspond with software modules comprising computer executable instructions to perform processing for the functions described below. Secondary storage device may include a hard disk drive, solid state drive, floppy disk drive, CD drive, DVD drive, Blu-ray drive, ROM, or other types of non-volatile data storage. Processor may execute applications, computer readable instructions or programs. The applications, computer readable instructions or programs may be stored in memory, in secondary storage, or may be received from the Internet or other network 20. Input device may include any device for entering information into device 12, 14, 16, 18, 22. For example, input device may be a keyboard, key pad, cursor-control device, touch-screen, camera, optical sensors, biometrics readers or sensors, thermal sensors, radio receiver, or microphone. Display device may include any type of device for presenting visual information. For example, display device may be a computer monitor, a flat-screen display, paper thin display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; an optical source, microwaves, thermal emissions, electromagnetic emissions or other forms of RAM or ROM. The computer-readable media may include instructions for controlling the devices 12, 14, 16, 18, 22 and/or processor to perform a particular method.

For any of devices 12, 14, 16, 18, 22, the actions or functions performed by the particular device may be broken down and/or distributed across a number of devices. For example, the terminal 12 may include an externally-facing machine, an internally-facing machine, and a machine for performing processing situated between the externally-facing and internally facing machines.

In the description that follows, devices such as terminal 12, system provider infrastructure 14, service provider infrastructure 16, cold storage devices 18, and blockchain infrastructure 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the terminal 12. For example, a system provider user using the system provider server 14 may manipulate one or more input devices (e.g. a mouse and a keyboard) to interact with a user interface displayed on a display of the system provider server 14. Generally, the device may receive a user interface from the network 20 (e.g. in the form of a webpage). Alternatively, or in addition, a user interface may be stored locally at a device (e.g. a cache of a webpage, local webserver, a mobile or desktop application).

Terminal 12 may be configured to receive and send a plurality of information, to and from each of the system provider infrastructure 14, service provider infrastructure 16, cold storage devices 18, and blockchain infrastructure 22. Generally, the information may comprise at least an identifier identifying the system provider, service provider, cold storage, or blockchain infrastructure computer. For example, the information may comprise one or more of a username, e-mail address, password, social media handle, mobile, ESN, IMEI, MEID, transaction ID, account identifier, hardware ID, public key, or other.

In response to receiving information, the terminal 12 may store the information in storage database. The storage may correspond with secondary storage of the devices 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with terminal 12. In some cases, storage database may be located remotely from terminal 12 and accessible to terminal 12 across a network for example. In some cases, storage database may comprise one or more storage devices located at a networked storage location or cloud provider.

The system provider infrastructure 14 may be associated with a system provider account, identifier, certificate, public key, private key. Similarly, the service provider infrastructure 16 may be associated with a service provider account, identifier, certificate, public key, private key, the cold storage device 18 may be associated with a cold storage account, combination of hardware IDs, unique identifier, certificate, public key, private key, and the blockchain infrastructure 22 may be associated with a blockchain computer account, identifier, certificate, public key, private key. A suitable mechanism for associating a device with an account is expressly contemplated. In some cases, a device may be associated with an account by a pairing mechanism (using a validated and authenticated set of credentials (e.g. hardware IDs or unique identifiers, a cookie, login, code input, multi-factor authentication, biometric input, telemetry, certificate, public key, private key, a PIN, or password etc.) to the terminal 12. The terminal 12 may verify the credentials (e.g. determine that the received password matches a password associated with the account). If a device is associated with an account, the terminal 12 may reinforce its consideration of further acts by that device to be associated with that account. Similarly, the terminal can associate with the Service Provider and System Provider infrastructure, and relay the other devices pairing information to solidify the consideration of further acts by that device to be associated with this account.

Figure 2:
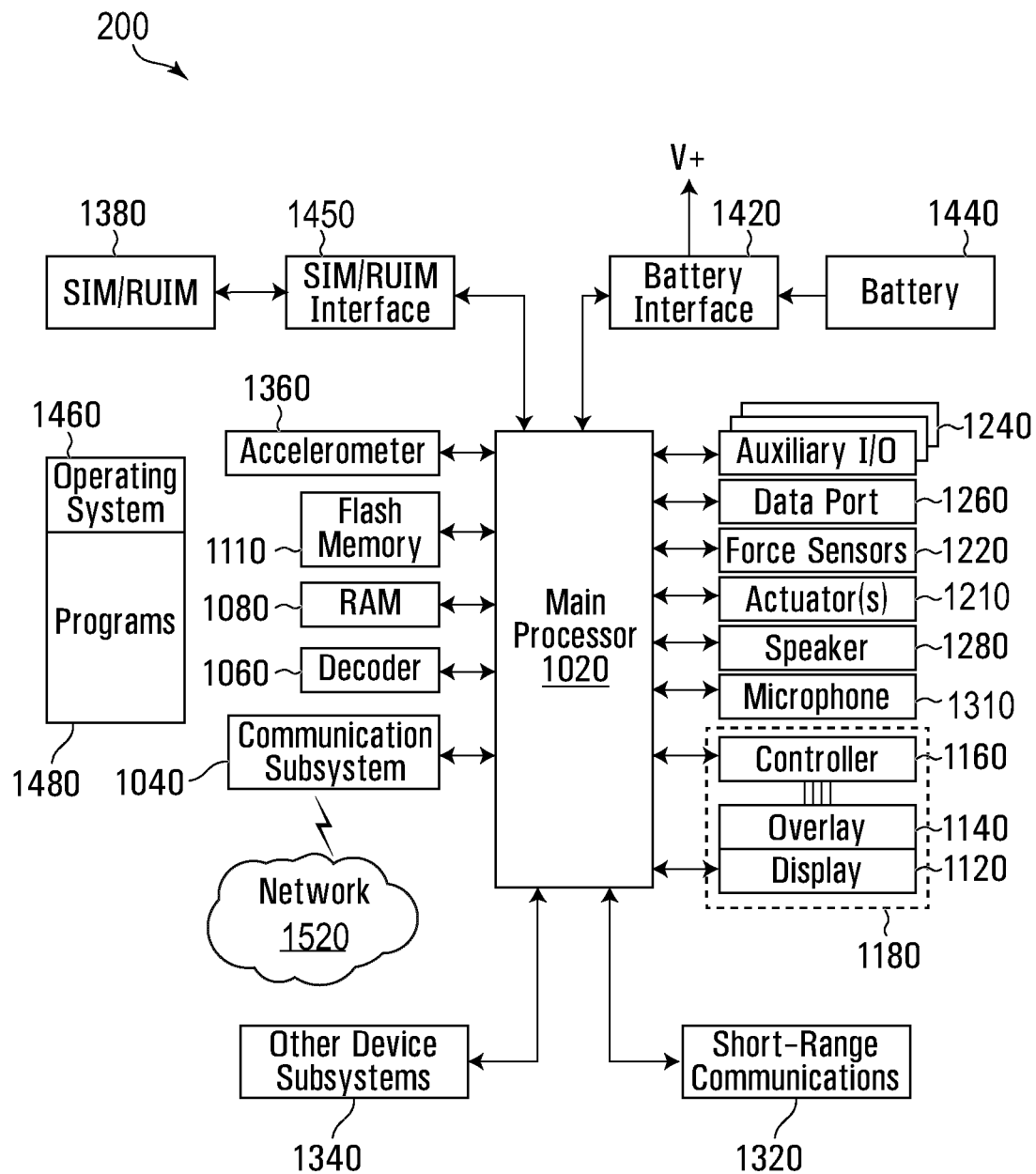
FIG. 2 is a block diagram of a terminal of the system of FIG. 1.

Referring now to FIG. 2, shown therein is a simplified block diagram of components of a mobile device or portable electronic device 200, according to an embodiment. In other embodiments, the device 200 may be a non-portable device (e.g. desktop, server computer etc.). The portable electronic device 200 includes multiple components such as a processor 1020 that controls the operations of the portable electronic device 200. Communication functions, including data communications, voice communications, or both may be performed through a communication subsystem 1040. Data received by the portable electronic device 200 may be decompressed and decrypted by a decoder 1060. The communication subsystem 1040 may receive messages from and send messages to a wireless network 1520.

The wireless network 1520 may be any type of wireless network, including, but not limited to, data-centric wireless networks, audio-centric wireless networks, video-centric wireless networks, optical data transfers and dual-mode networks that support audio/video and data communications.

The portable electronic device 200 may be a battery-powered device and as shown includes a battery interface 1420 for receiving one or more rechargeable batteries 1440. In an embodiment, the device 200 may include power transfer over near-field communication (NFC).

The processor 1020 also interacts with additional subsystems such as a Random Access Memory (RAM) 1080, a flash memory 1110, a display 1120 (e.g. with a touch-sensitive overlay 1140 connected to an electronic controller 1160 that together comprise a touch-sensitive display 1180), an actuator assembly 1210, one or more optional force sensors 1220, an auxiliary input/output (I/O) subsystem 1240, a data port 1260, a speaker 1280, a microphone 1310, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 1020 may be displayed on the touch-sensitive display 1180.

The processor 1020 may also interact with an accelerometer 1360 as shown in FIG. 2. The accelerometer 1360 may be utilized for detecting direction of gravitational forces or gravity-induced reaction forces.

To identify a subscriber for network access according to the present embodiment, the portable electronic device 200 may use a Subscriber Identity Module or a Removable User Identity Module (SIM/RUIM) card 1380 inserted into a SIM/RUIM interface 1450 for communication with a network (such as the wireless network 1520). Alternatively, user identification information may be programmed into the flash memory 1110 or performed using other techniques.

The portable electronic device 200 may also include an operating system 1460 and software components 1480 that are executed by the processor 1020 and which may be stored in a persistent data storage device such as the flash memory 1110. Additional applications may be loaded onto the portable electronic device 200 through the wireless network 1520, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1520 through the communication subsystem 1040.

For voice communications, the overall operation of the portable electronic device 200 may be similar. The speaker 1280 may output audible information converted from electrical signals, and the microphone 1310 may convert audible information into electrical signals for processing.

Figure 3A:
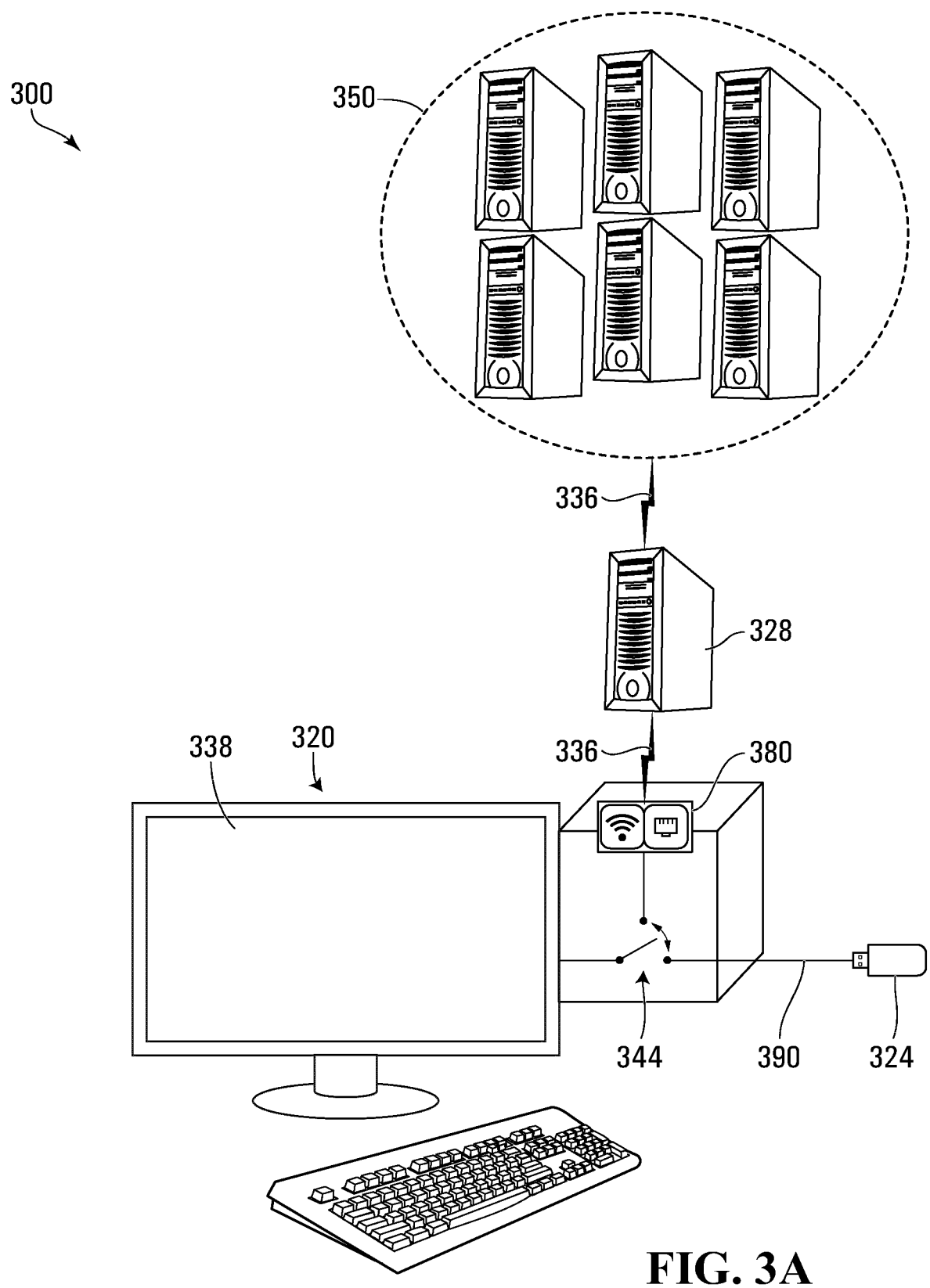
FIG. 3A is a schematic diagram of a system for performing secure transactions of blockchain assets, in accordance with an embodiment.

Referring now to FIG. 3, shown therein is a system 300 for secure blockchain transacting of a digital asset, according to an embodiment. The system 300 provides secure blockchain transactions by implementing various measures to prevent sensitive information from being exposed to outside parties. The system 300 is configured to support a plurality of modes, wherein a mode corresponds to a limited number of actions that can be taken by the system 300 and its components. By switching between modes, the system 300 provides security to sensitive information.

The system 300 includes a plurality of entities connected by the system 300. The entities form a trust group. The trust group is a group of vetted participants contributing to the making of a secure blockchain transaction by a user. The number of entities in the trust group may increase or decrease depending on the configuration of the system 300.

The entities include the end user and a system provider. The system provider may also be referred to as the network operator or subnetwork operator. The system provider provides a subnetwork for performing secure blockchain transactions. In some embodiments, the entities also include a third-party service provider.

Other variations of the system 300 may include a plurality of system providers, end users, and/or service providers. In a particular embodiment, the system provider and the service provider may be the same entity acting with separate identities and from separate infrastructure, in order to fulfill the role of a lack of service offering by independent service providers.

The end user is an entity (e.g. an individual) that is interacting on the system provider subnetwork for a given blockchain (or multiple blockchains).

The system provider is a common entity to all accounts within the subnetwork system. The system provider can restrict transactions to make sure the transactions stay within the limits of the system operator subnetwork while allowing service providers to let their end-users interact with other service providers or end-users of these service providers. The system provider may also provide oversight and visibility on all the operations occurring in the subnetwork, without the need to know the exact details and private information of the end-user. The system provider may also play a role in emergency recoveries of the end user's wallet between the system provider and the service provider and under strict legal provisions.

The service provider is an entity (e.g. a company, an organization) willing to offer a service on one or more blockchains. The service provider has an established relationship with its end users (e.g. clients, employees or another organization). For example, a bank may offer system provider bitcoin wallets tied to their clients' bank accounts. In another example, the service provider may be a governmental body, a hospital, a medical clinic offering medical records on the blockchain to its citizens/patients. The service provider can provide the Know-your-customer part as they already have this and safeguard their end-users' private and personal information. The service provider is/may be a second party involved in any account recovery (for an account tied to their service), whether it be conducted between the end user and the service provider, or, under strict legal provisions, between the system provider and the service provider (e.g. warrant, proof of will, court order, loss or damage to the end-user cold storage and backups while proof-of-identity can be verified otherwise, etc.).

The system 300 includes a terminal 320, a cold storage device 324 and a system provider server/infrastructure 328. The system 300 may also include a service provider server/infrastructure (not shown in figures). In an embodiment, the service provider server is in communication with the terminal 320 and the system provider server 328 acting as an intermediary. In another embodiment, the Service Provider and the terminal 320 are both exclusively communicating with the System Provider 328.

The terminal 320 is connected to the system provider server 328 via a communication network 336. The communication network 336 may use Wi-Fi, Bluetooth, near field communication, optical data transfer, thermal emissions, or the like over various protocols such as IP or HTTPS. In an embodiment, the communication network 336 is the Internet. In another embodiment, the communication network 336 is a network using a protocol other than IP and/or using another infrastructure to communicate with remote computers. In another embodiment, the communication network 336 is a wired network.

The cold storage device 324 includes a communication interface. The communication interface may be configured to receive an unsigned blockchain transaction from the terminal 320 when the terminal 320 is disconnected from the network 336. The communication interface may be configured to transmit a signed blockchain transaction to the terminal 320 when the terminal 320 is disconnected from the network 336. The communication interface may use any suitable communication mechanism such as Bluetooth, encrypted Bluetooth, optical communication, Wi-Fi, wired communication, near-field communication, thermal emissions, or the like.

The terminal 320 is a client computing device for use by the user. The terminal includes a processor and a memory (e.g. processor 1020 and memory 1110 of device 200). The terminal 320 may be a tabletop computer, a laptop computer, a mobile computer such as a smartphone, or any device suitable to store and process information. In various embodiments, the terminal 320 may be internal or external to a computer. In an embodiment, the terminal 320 is separable from the computer. Accordingly, the terminal 320 may utilize processing, storage, or other capabilities of the computer to which it is internally or externally linked.

The terminal 320 includes a display 338 for displaying a graphical interface for user input and interaction.

The terminal 320 includes a communication interface. The communication interface includes a first communication port 380. The first communication port 380 is a network communication port for connecting the terminal 320 to the network 336 and for facilitating communication and data transfer between the terminal 320 and the system provider server 328.

The communication interface includes a second communication port 390. The second communication port 390 is a cold storage communication port for connecting the terminal 320 to the cold storage device 324 and facilitating communication and data transfer between the cold storage device 324 and the terminal 320.

The terminal 320 includes a user interface for displaying information to the user and receiving input from the user. The user interface may be an automated user interface. The user interface guides the user through the completion of the setup of the system 300, as well as in the management of the end-user's accounts and pairing of devices.

The terminal 320 may provide an interface to the cold storage 324 in such a way to allow security features of the system 300 such that the security features are effectively established and followed. The security features may include: distribution of encrypted back-up of the wallet/key (for example, using AES 256) by the user but kept by a trusted third party and/or system provider; distribution of fragmented, encrypted paper and digital recovery seeds; client authentication to the system provider or service provider infrastructure (as applicable) to access information of the user on the terminal 320; and enforcement of strong password policies, multi-factor authentication, etc. In some embodiments, it could also be an intermediary for secure updates to be delivered to paired cold storage devices.

The processor of the terminal 320 is configured to execute one or more modules and/or engines. The processor includes a transaction generator module (e.g. transaction generator module 412 of FIG. 4). The transaction generator module is configured to create an unsigned blockchain transaction from user data and sender and recipient data (e.g. user data 408 and sender and recipient data 410, 417 of FIG. 4). The user wallet data may include account data, address data, and key data. The recipient data may include a recipient address. Specifically, the transaction data may include a user address, a recipient address, timestamp data, and asset data (e.g. an amount and type of digital asset being transferred). The transaction data may include all the necessary information for sending a blockchain transaction to a blockchain network except for a signature.

The transaction generator module may initiate the creation of an unsigned blockchain transaction while the terminal 320 is connected to the network 336 (i.e. online) or while the terminal 320 is not connected to the network 336 (i.e. offline). The completion of this process will be done by the System Provider 328 and sent to the terminal 320. In another embodiment, the terminal itself could complete this process fully as long as previously connected with the System Provider 328.

In an embodiment, the transaction represented by the transaction data may be a blockchain asset (e.g. cryptocurrency, records, document or other asset) transfer. The transaction data may include a set of instructions for modifying the state of the blockchain. The transaction must be signed for the transaction to modify the blockchain. For example, to send cryptocurrency, the user generates a transaction via the transaction generator module that authorizes the transfer of the cryptocurrency from a first account (corresponding to the user) to a second account (corresponding to a recipient). The transaction may be generated online or offline.

Figure 4:
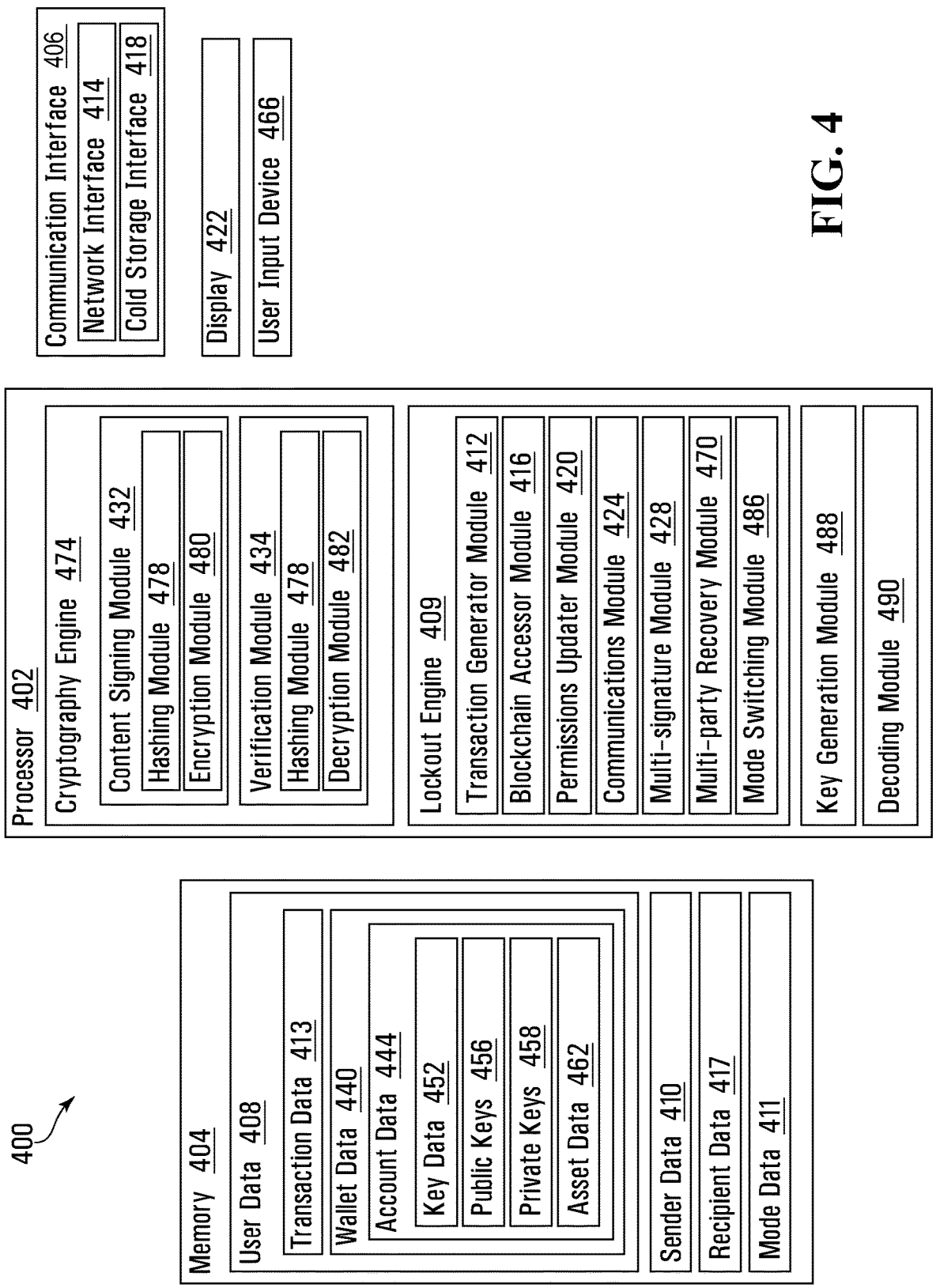
FIG. 4 is a block diagram of a computer system for performing a secure blockchain transaction

The processor of the terminal 320 includes a blockchain accessor module (e.g. blockchain accessor module 416 of FIG. 4). The blockchain accessor module is configured to provide the user with access to the blockchain, namely the blockchain computers 350, through the system provider server 328. The blockchain accessor module may be configured to send signed transaction data representing a signed blockchain transaction to the blockchain computers 350 for confirmation into a block. The blockchain accessor module may be configured to allow the user to view the current status of different user accounts.

The blockchain accessor module may be configured to allow the user to exchange information (e.g. addresses) with other blockchain users with whom digital assets are to be transacted. This is possible provided the other users provide their respective accounts for the system provider to provide an address. The other blockchain users may be offline. The other blockchain users may use system 300 to receive funds. To do so, the other blockchain users have their own cold storage device 324 with a private key. Assets can then be sent to an address associated with a public key derived from that private key. The other blockchain users using system 300 can transact via a terminal 320 available to them.

The blockchain accessor module interacts with the system provider to have the required information to interact on the blockchain.

In an embodiment, one or more of the components of the system 300 (for example, terminal 320, cold storage device 324, system provider server 328, or the service provider infrastructure/server) implement a cryptography engine (e.g. cryptography engine 474 of FIG. 4). The cryptography engine implements secure information and communication techniques derived from mathematical concepts and a set of rule-based calculations called algorithms to transform messages in ways that are hard to decipher. The cryptography engine may be used to encrypt or decrypt data received or sent by one or more components of the system 300, as well as sign and help with the confirmation of the transactions on the blockchain.

The cryptography engine may include a hashing module (e.g. hashing module 478 of FIG. 4), an encryption module (e.g. encryption module 480 of FIG. 4), and a decryption module (e.g. decryption module 482 of FIG. 4).

Hashing provides a way for everyone on the blockchain to transit data in a lightweight manner while protecting private information while maintaining data integrity and fast verification mechanisms. Digital signatures provide a way to ensure that only the rightful owner of an asset may agree to its transaction, and a given transaction is always agreed upon by its rightful owner. These two properties are used to ensure that the blockchain has not been corrupted or compromised, providing identity verification, data integrity and immutability.

The hashing module takes an arbitrary amount of input data, applies an algorithm to the input data, and generates a fixed-size output data called a hash. Hashes are used in blockchains to represent the current state of the world. Hashes may be used in the key derivation process, transaction signing process, transaction confirmation process, etc. Specifically, in the case of blockchain, the input is the entire state of the blockchain, meaning all the transactions that have taken place so far and the resulting output hash represents the current state of the blockchain. The first hash is calculated for the first block or the Genesis block using the transactions inside that block. The sequence of initial transactions is used to calculate a block hash for the Genesis block. For every new block that is generated afterward, the hash of the previous block is also used, as well as its own transactions, as input to determine its block hash. This is how a chain of blocks is formed, each new block hash pointing to the block hash that came before it. This system of hashing implemented by the hashing module guarantees that no transaction in the history can be tampered with because if any single part of the transaction changes, so does the hash of the block to which it belongs, and any following blocks' hashes as a result.

The encryption/decryption modules use cryptography to prove that a message originates form a specific person (e.g. the user) and no one else, like a thief, impersonator or hacker.

The encryption/decryption modules may implement an asymmetric encryption system. The user generates a key pair including a public key and a private key using a known algorithm. The public key and private key are associated with each other through a mathematical relationship.

The public key is distributed publicly to serve as an address to receive messages (or transfers) from other users, like an IP address or home address. The private key is kept secret and is used to digitally sign the message (or transaction) sent to other users. The signature is included in the message (or transaction) so that the recipient can verify using the sender's public key. This way, the recipient can be sure that only the sender could have sent the message (or transfer).

Generating a key pair is analogous to creating an account on the blockchain, but without having to register anywhere. Every transaction that is executed on the blockchain is digitally signed by the sender using their private key. This signature ensures that only the owner of the account can move blockchain assets out of the account.

The system may include one or more peripherals connected to the terminal 320. Peripherals may include external storage, USB drives and the like.

The peripherals connected to the terminal 320 present another source of security vulnerability for the user. Vulnerability of peripherals may be addressed at an organizational level, for example by properly training employees dealing with the blockchain asset on the terminal 320. The system 300 may forbid connections of unexpected peripherals to the terminal 320. This may include removing any typical connectors and providing anti-tamper, tamper-resistant and tamper-evident devices.

In an embodiment, the terminal 320 includes no operative connector for peripherals (hence why not shown in FIG. 3). By having no operative connector for peripherals, the terminal 320 can prevent security vulnerabilities associated with the connection of peripherals to the terminal 320. For example, the terminal 320 may have no USB socket or other connector available for connecting the peripheral. In such an embodiment, the cold storage device 324 is connected to the terminal 320 using a secure and encrypted form of communication.

The system 300 may include a service provider server infrastructure. The service provider server infrastructure may provide the terminal 320 with blockchain access services through communication network 336 in lieu of or in addition to the system provider server 328.

The system 300 includes blockchain computers 350. The blockchain computers 350 are connected to the system provider server 328. The system provider server 328 may be connected to blockchain computers 350 via an internal and private communication network, such as the communication network 336.

The blockchain computers 350 are configured to implement the blockchain technologies for the blockchain assets. The blockchain computers 350 hold a distributed ledger and verify the integrity of the blockchain transaction. The blockchain computers 350 may be lightweight nodes, full nodes, super nodes, or miners. The blockchain computers 350 may be remote (for example, from the system provider server 328). The blockchain computers 350 may be managed by a plurality of people (including but not exclusively, the service provider). The blockchain computers 350 may be geographically dispersed.

The node and the wallet may be two separate subsystems of a blockchain platform (e.g. MultiChain). The node tracks global blockchain state. The wallet may track transactions of particular interest to an instance, plus it holds keys. Information is generally fed from node to wallet, since the wallet often needs to know about the global state of the blockchain. The full node contains a full copy of the blockchain. A light client is referencing a copy of the blockchain of a trusted full node. This allows users to transact on the blockchain without downloading an entire copy of the blockchain. Full nodes help process or validate transactions. A full node may be required for mining. Full nodes also contribute to the functionality of a blockchain network. A party running a full node helps support the network.

The communication network 336 (e.g. the Internet) is a manner of communication between the system provider server 328 and the terminal 320 (acting as the client). In another embodiment, the terminal 320 is connected to the system provider server 328 via a private network using dedicated infrastructure or other protocols for communicating data. The private network may be a point-to-point connection. The private network may provide for greater security of communications.

The communication network 336 is the main source of security vulnerability for the terminal 320. The communication network 336 is also the main source of security vulnerability for the peripherals connected to the terminal 320.

The terminal 320 may have other sources of security vulnerability. In an example, a second source of security vulnerability to the terminal 320 is hacking by social engineering. In hacking by social engineering, the user of the terminal 320 (e.g. an employee of an organization) is tricked or deceived by a hacker trying to look legitimate, thereby giving access to the hacker. Such hacking can occur at any end-point of the system 300. Hacking by social engineering may include targeting the service provider, the user, or third-parties.

Proper training of employees as well as strong decoupled access protocols also greatly reduce the security risks within the service provider and third parties related to hacking by social engineering. In the system 300, each entity has its own keys stored offline; thus, in order for such an attack approach to be successful an employee would have to deliberately act in each entity, in conjunction with a specifically targeted attack against each user to be compromised, including physical access to the cold storage device 324 of each user.

The system 300 includes a cold storage device 324. The cold storage device 324 includes a memory for storing user data and a communication interface for transferring data to and from the cold storage device 324. The memory may be a flash memory. The communication interface may be a USB, Bluetooth, NFC, or the like. The cold storage device 324 is connectable to the terminal 320 such that data stored on the cold storage device 324 can be transmitted to the terminal 320. Data transfer between the terminal 320 and the cold storage device 324 is initiated by the user, for example via the user interface 338.

The cold storage device 324 stores sensitive user data in the memory that is needed to perform a blockchain transaction using the system 300. The sensitive user data may include one or more private keys. The private key data is used to sign the unsigned transaction data to generate a signed blockchain transaction. The user wants the private key to remain secret (i.e. known only to the user) in order to maintain the integrity of the user accounts and to maintain control over the assets in the user accounts. The cold storage device 324 is not connectable to the Internet. However, it is possible that, under normal circumstances, data stored on the cold storage device 324 could be accessible and thus vulnerable when the cold storage device 324 is connected to the terminal 320 and the terminal 320 is connected to the internet.

The cold storage device 324 may be a flash drive (e.g. a USB key), an external hard drive, an SSD memory, a disk (e.g. CD-ROM, magnetic disk, floppy disk, biodevices, etc.), a card with a chip and a reader therefor, a biodevice (e.g., a chip embedded in a body) and a reader therefor, or the like. The cold storage device 324 may be internal to the terminal 320. The cold storage device 324 may be disconnected.

While the cold storage device 324 may depicted as a USB-type device in FIG. 3, it is to be understood that this is not limiting and that data transfer may occur between the terminal 320 and the cold storage device 324 according to any suitable data transfer method.

The cold storage device 324 stores a digital wallet in the memory. The digital wallet is and electronic file (e.g. a wallet.dat file) that includes wallet data including user private keys, public keys, scripts (which correspond to addresses), key metadata (e.g. labels), and the transactions related to the wallet. The digital wallet may be a cold wallet. In variations, the cold storage device 324, the terminal 320, or the cold storage device 324 and the terminal 320, may be used to generate the digital wallet.

Figure 6:
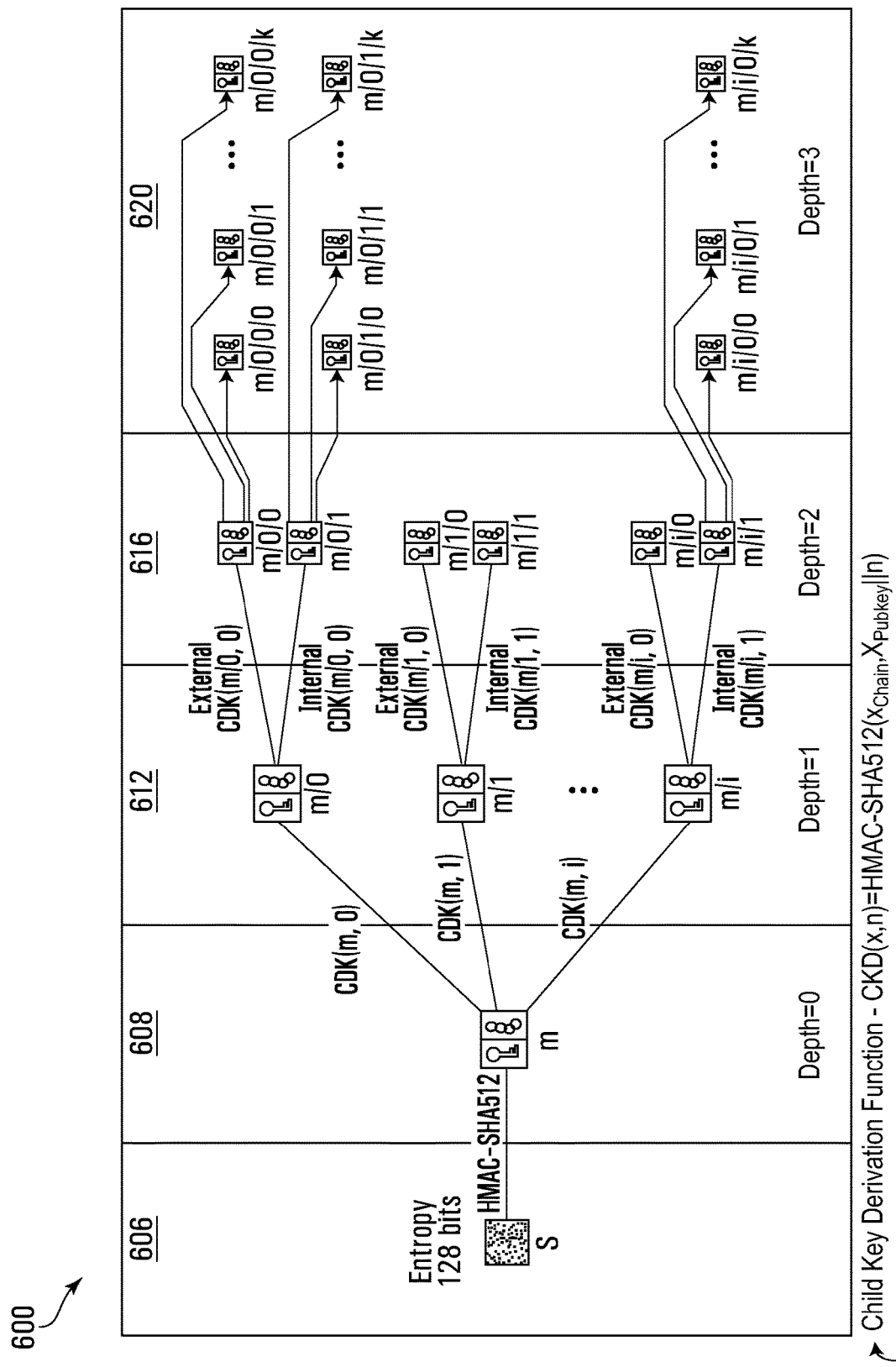
FIG. 6 is a diagram of a derivation of hierarchical deterministic wallets for use with a system for performing a secure transaction of a digital asset, according to an embodiment.

In an embodiment, the digital wallet is a hierarchical deterministic (HD) wallet (for example, FIG. 6). In another embodiment, the digital wallet may be a non-hierarchical deterministic wallet. The HD wallet also includes an HD seed and derivation paths for each private key. In some cases, certain of the wallet data is transferred to or exchanged with the terminal 320. Private keys stored on the cold storage device 324 are never transferred to the terminal 320.

The cold storage device 324 is permanently offline. The wallet data that the user wants to keep protected (e.g. private keys), and does not want transferred over the network 336, is stored in the memory of the cold storage device 324. The system 300 is configured to ensure that the cold storage device 324 never exposes the sensitive wallet data (e.g. private keys) while the terminal 320 is connected to the network 336.

The flow of the blockchain asset transfer is initiated from the deeper ends of the system 300, namely the cold storage device 324. This helps prevent multi-stage infections as the cold storage device 324 would have to be compromised at the outset for the cold storage device 324 to infect itself via data exchange with the terminal 320.

The cold storage device 324 includes a processor. The processor executes on one or more modules or engines. The processor is configured to generate a signed transaction from the unsigned transaction data and the private key data. The processor signs the transaction when the terminal 320 is offline. The processor uses a mathematical function to sign the transaction.

The signed transaction is transmitted from the cold storage device 324 to the terminal 320 via the communication interface of the cold storage device 324. The terminal 320 receives the signed transaction via the cold storage port 390. The signed transaction can be stored in the memory of the terminal 320.

The signed transaction is broadcast onto the blockchain network (i.e. to the blockchain computers 350) (for example, via blockchain accessor module 416). The blockchain network confirms the transaction into a block.

The system 300 includes a switch connector 344. The switch connector is configured to prevent simultaneous connection of the terminal 320 to both the communication network 336 and the cold storage device 324. The switch connector 344 may be controlled or implemented by a mode switching module (e.g. mode switching module 486 of FIG. 4). The switch connector 344 protects the cold storage device 324 (and the private keys stored thereon) from unwanted exposure to outsiders that may occur through the network 336.

The switch connector 344 allows the cold storage device 324 to transfer wallet data over the terminal 320 without the communication network 336 and the cold storage device 324 ever being connected to the terminal 320 at the same time The cold storage device 324 does not include a port of communication with the network 336 and thus, when the terminal 320 is not connected to the network 336, there is no access to the cold storage device 324 via the network 336. The switch connector 344 air-gaps the connection between the terminal 320 and the cold storage device 324 (i.e. the cold storage device 324 is separated and isolated from the communication network 336).

In an embodiment, the switch connector 344 includes a hardware switch. The hardware switch may be an electronic logic gate including a diode or transistor. Advantageously, the switch connector 344 having the hardware switch may be more secure than a software implementation of the switch, given that hardware is immune to malware that may attempt and succeed at stealing from a software implementation.

In another embodiment, the switch connector 344 includes a software switch. The software switch may be controlled by a lockout engine (such as lockout engine 409, of FIG. 4). Implementing the switch connector 344 having the software switch may be easier to implement than a hardware switch.

The switch connector 344 connects the terminal 320 with, alternatively, the network communication port 380 or the cold storage port 390. The switch connector 344 may be implemented directly within the device drivers of the terminal 320. The switch connector 344 may use system call hooking within the device drivers. The switch connector 344 is configured to only allow one connection for terminal 320 at a time. For example, the switch connector 344 may disable either the network communication port 380 or the cold storage port 390 and enable the other.

The cold storage port 390 corresponds to the type of the cold storage device 324. There can be more than one type of connector, which all connect to the switch connector 344.

In an embodiment, the cold storage port 390 uses encrypted Bluetooth communication. In another embodiment, the cold storage 390 uses NFC communication. In a particular embodiment, the NFC communications are specially crafted. The network communication port 380 may be an ethernet adapter.

Figure 3B:
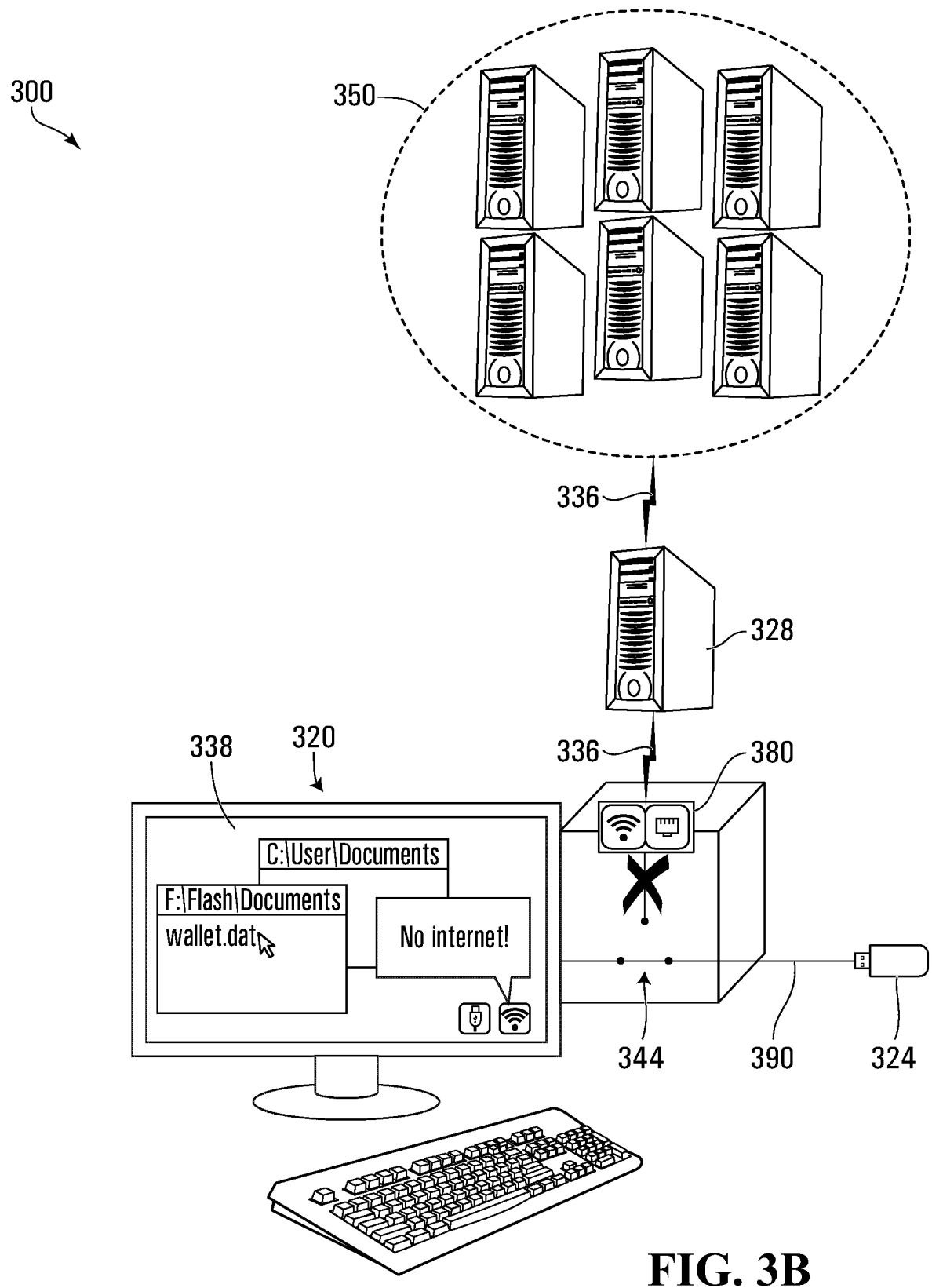
FIG. 3B is a schematic diagram of the system of FIG. 3A in an offline mode.

Referring now to FIG. 3B, shown therein is the system 300 having the terminal 320 in an offline mode, according to an embodiment. In the offline mode, the switch connector 344 connects the terminal 320 to the cold storage device 324. The switch connector 344 prevents access to the cold storage device 324 via the network 336. The switch connector 344 prevents malware that may present on the cold storage device 324 or that may be on the terminal 320 from communicating through the network 336 to an outside computer when the cold storage device 324 is connected to the terminal 320 and compromising sensitive data (e.g. private keys). In the offline mode, the unsigned transaction can be signed on the cold storage device 324.

Figure 3C:
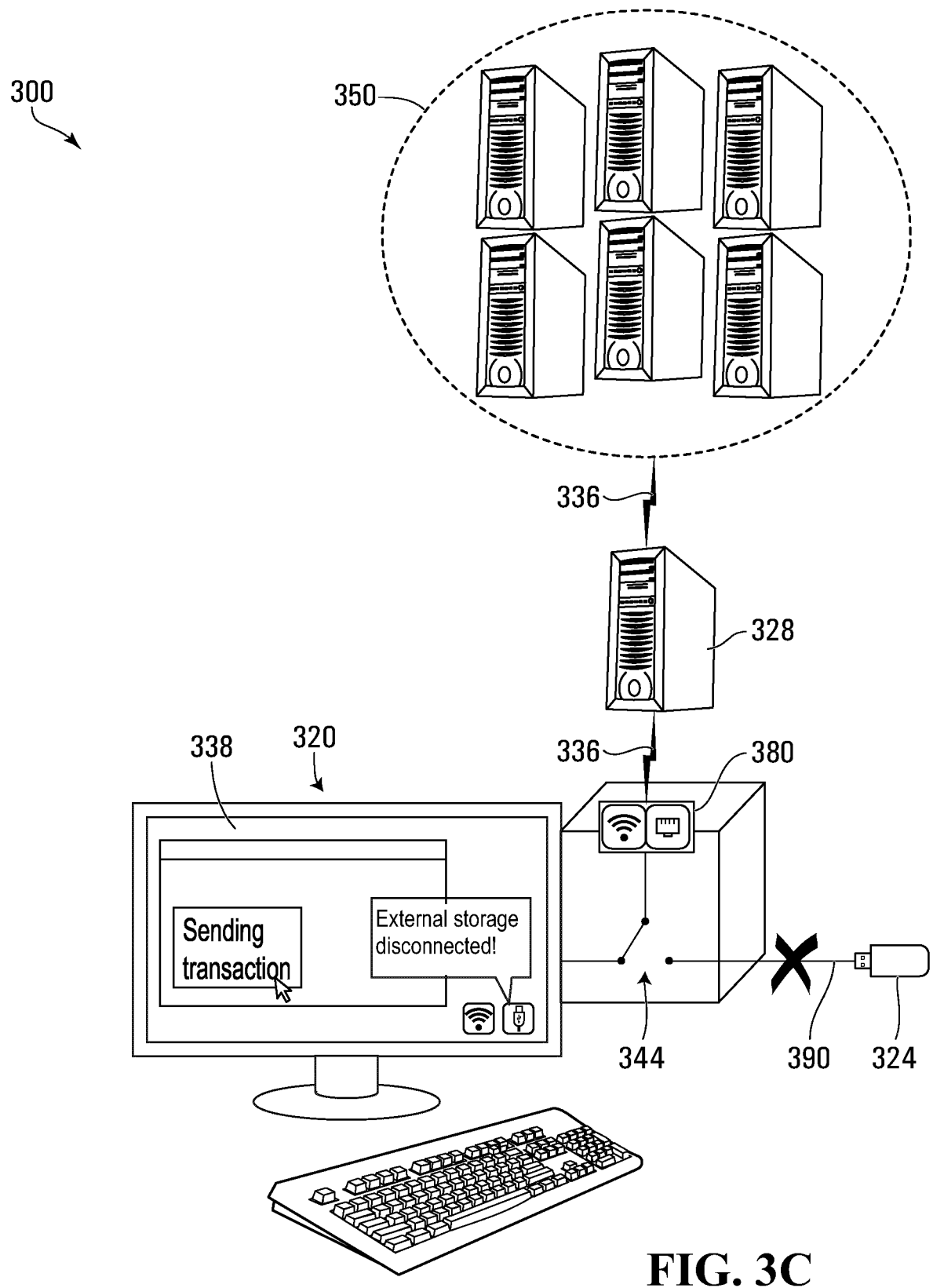
FIG. 3C is a schematic diagram illustrating the system of FIG. 3A in an online mode.

Referring now to FIG. 3C, shown therein is the system 300 having the terminal 320 in an online mode, according to an embodiment. In the online mode, the terminal 320 is connected to the network 336 and thus to the system provider server 328. The switch connector 344 connects the terminal 320 to the network 336. In the online mode, the terminal 320 can communicate with the system provider server 328 via the network 336. For example, in the online mode, the terminal 320 can transmit the signed transaction (received from the cold storage device 324) to the system provider server.

In an embodiment, the system 300 may be used in a corporate context. The user may be an employee in an organization. The user operating on a system provider infrastructure (e.g., via system provider server 328) can use the terminal 320 to access and view documents that the user has permission to view in the cold storage device(s) 324 of the organization when the terminal 320 is connected to the cold storage device 324. When the user wants to transfer the blockchain assets stored on the cold storage device 324 to a party outside of the organization (e.g., to another organization or another location within the same organization), the user can select a blockchain document to be transferred. The blockchain document requires permissions to view, which can be granted via the permissions within the trust group or by sending the document to a specific address (recipient) that would obtain the rights to view the document. Further, the blockchain document cannot be altered without creating a new version on the blockchain.

The user disconnects the terminal 320 from the cold storage device 324. The user connects the terminal 320 to the network communication port 380 (e.g. an ethernet adapter/port or turn on WiFi) and executes the transfer online. Connecting the terminal 320 to the network communication port 380 connects the terminal 320 to the system provider server 328. The system provider server 328 signs the transaction. The system provider server 328 broadcasts the signed transaction to a previously determined address. The method of broadcasting the signed transaction is inherent to each blockchain.

Using the system 300, the user is never browsing the blockchain documents on the cold storage device 324 while the documents are "hot" (i.e., when the terminal 320 is online). The transfer of the blockchain document(s) takes place over the system provider infrastructure, as previously determined offline in the terminal 320. This reduces the chance of malware and other attacks. Vulnerability to attack is reduced because the terminal 320, the cold storage device 324, and the physical link of the switch connector 344 are all previously determined by the system provider as to how and what to access. This greatly reduces any chance of backdoors or interceptions. Any backdoor or interception would be the result of previously tampering with the devices 320, 324 directly.

In another embodiment, the system 300 can be used in a personal context, such as where the user is an individual trading cryptocurrency. The system 300 includes the user having access to the terminal 320. The terminal 320 is configured to only access the system provider infrastructure. The terminal 320 is not used for other tasks.

Using the terminal 320, the user can view the types and amount of cryptocurrency (or other blockchain asset) held by the user. The types and amount of cryptocurrency are stored in a wallet.

The system 300 includes a watch-only mode. In the watch-only mode the user can view the wallet on the terminal 320. The watch-only mode is a 'mode' that allows the user to have and access the wallet without the private key using the terminal 320. The system 300 does not allow the user to sign a blockchain transaction from the terminal 320 in watch-only mode. Using the watch-only mode, the user can monitor the status of the its wallet without the security concerns associated with signing a transaction using the terminal 320. One such security concern is the exposure of a private key via the communication network 336 linking the terminal 320 to the system provider server 328.

Using the system 300, the user may instruct the performance of a trade of the blockchain asset via the terminal 320. The user connects the physical link or a switch connector 344 to a cold storage device 324. The user connects the cold storage device 324 to the terminal 320. The terminal 320 is not connected to the communication network 336 at this point (i.e. the terminal 320 is offline).

Once the signed transaction transfer from the cold storage device 324 to the terminal 320 is complete, the user reconnects the terminal 320 to the communication network 336. The reconnection can be done by switching the switch connector 344 (or physical link) to the network communication port 380 on the terminal 320. As described above, the terminal 320 is configured/preprogrammed to only access the system provider server 328 via the network 336. Once the terminal 320 is connected to the network 336, the terminal 320 executes the trade of the blockchain asset.

Using current approaches, most exchanges will force the user to first transfer the cryptocurrency into a hot wallet that makes the exchange service accessible online. The user transfers fiat currencies to the exchange. The exchange transfer coins (or other cryptocurrency) from a wallet of the exchange to a first user wallet. The first user wallet is a hot wallet owned and controlled by the exchange. From there, the user transfers the coins to a second user wallet that is owned and controlled by the user to start spending the coins outside the realm of the online exchange service. This is a secondary step that can be skipped directly to in the system 300, saving one transaction in the process.

In an embodiment, the system 300 can be used to securely transact cryptocurrency. The system 300 allows the user to hold cryptocurrencies in and trade cryptocurrencies from a cold storage wallet (i.e. an offline wallet) on the cold storage device 324. Trading and holding using the cold storage wallet are easier and more secure than traditional methods. When the terminal 320 is connected to the communication network 336, the user can use the system 300 to trade user currencies without having to transfer the asset from the cold storage wallet to an online wallet (hot storage wallet) that is controlled by an exchange platform. Using the system 300, the user only provides an address via the terminal 320 to which the exchange platform transfers the coins directly. Thus, the system 320 allows the user to have full control of the coins without the security risks associated with storing the coins in a hot wallet (online wallet).

Accordingly, in some embodiments, the system 300 performs a single transaction instead of two steps as in traditional approaches. By reducing the number of transaction steps, the system 300 may reduce transaction fees and lag times (i.e. funds are available more quickly, less waiting for the user) associated with the transaction. For example, the system 300 can reduce transaction fees associated with validating of the transaction and provide faster availability of the funds.

The system 300 includes one validation instead of multiple validations. The only transaction that needs to be added to a block is the transaction from the exchange to the cold storage device 324. Since the user does not need to wait for the second transaction to also be added to a block, the total elapsed time is reduced for a full exchange loop from the cold storage device 324 to the converted currency being transferred in the fiat bank account. The full exchange loop includes the purchase of cryptocurrency with fiat and the exchange of the purchased cryptocurrency back into fiat (or another cryptocurrency). If the user wants to exchange in fiat again, then the system only needs to send to the exchange wallet and get the funds released into the appropriate fiat currency account. In this scenario, the system 300 requires only a single validation. The system 300 alleviates the need for centralized third parties by embedding them into the user's transaction at each step along the way.

The time reduction, which may also be tied to a reduction in transaction fees, depends on the particular blockchain and may range from a few minutes to an hour. By reducing time through reducing the number of transactions, the system 300 may let the user react more quickly to market volatility. This may be particularly advantageous in a highly volatile cryptocurrency market. By reducing time requirements, the system 300 may reduce costs for the user, the user's bank or any third party that wants to receive a cryptocurrency payment and convert it to another currency or cryptocurrency.

The terminal 320 also acts as a regular wallet, allowing the user to interact with a blockchain without the need for an exchange. The transaction is always broadcasted from the system provider server 328, which alleviates the security risks associated with the user broadcasting himself. The system achieves this through implementing a multi-signature module (for example, multi-signature module 428 of FIG. 4). The multi-signature module implements a multi-signature approach. The multi-signature approach restricts the cryptographic key of the user to represent at most half of the required signature for the signing process for the blockchain transaction. This effectively means that the sum of keys involved in the multi-signature is no less than 2 and the user cannot possess both. The minimal approach would then be a 2 out of 2

Therefore, a one-to-one mapping of spending from a given address could only be between an external recipient and the trust group which includes the user, the system provider and n trusted third parties implementing the service to interact with their own respective system (for example, a bank offering the system to a client for interacting with their regular banking account).

Blockchain validation operations may be complex. They may require high calculating power to confirm or mine a single block in the blockchain. The complexity and high computing power requirements of some Blockchain technologies can produce adverse energetic and ecological burdens. The system 300, by requiring fewer transactions, reduces the ecological and energetic burdens associated with standard blockchain validation operations.

The terminal 320 hardware is recognized by the system provider server 328. The user enters a password on the terminal 320 once and the user is able to trade, for example by using the client-terminal 320 to access the system provider server 328. When the user wants to stop trading and enter a secure mode (i.e. cold storage mode/offline mode), the terminal 320 is disconnected from the communication network 336 (for example, by unplugging the hardware). The system is then in cold storage mode. When operating the terminal in cold storage mode, the user can access the data stored on the cold storage device 324.

In some embodiments, the system 300 is configured to implement a multi-party recovery method (for example, multi-party recovery module 470 of FIG. 4). The recovery method can be used to recover a lost password, a lost key, or information from a lost or broken device (e.g. cold storage device 324) of the user.

According to the recovery method, the user defines a seed extension. The seed extension may be a mnemonic extension. A seed is stored by a secondary party involved in the recovery effort, such as the system provider (for example, storing the seed on the system provider server 328). The secondary party has an encrypted copy of the seed with the mnemonic extension]. In a particular embodiment of the recovery method, the system 300 includes only the user and the system provider (and no third parties). In such a case, the user and the system provider each store a shared key that is encrypted with the mnemonic extension of the user. The user and the system provider each have an encrypted copy of the seed with the mnemonic extension. The user can recover a private key by using the seed with the seed extension. In a case where both the seed and the private key are lost, the user can request the seed from the system provider (e.g. via the system provider server 328) and use the seed and the mnemonic device to decrypt the private key.

In another embodiment, the multi-party recovery method implemented by the system 300 includes the user, the system provider, and a third party. The third party is a third-party service provider. The third-party service provider may be a bank, hospital, government body conducting elections, or the like. Using the system 300, the user can recover a private key of a wallet. The system 300 creates a fragmented secret including a number of shares of the secret, S, equal to or greater than the number of involved parties (here, three). By creating the fragmented secret, the system 300 provides multiple mechanisms of recovery. For example, in the eventuality that the user loses the digital wallet, the user forgets the master seed, the wallet must be passed on by necessity of law, or the like, the third-party service provider and the system provider can help recover the wallet.

The user extends the secret shared between the user and the third-party service provider. The user also extends the secret between the user and the main system provider. The third-party service provider extends the secret shared between the third party service provider and the system provider.

The system 300 automatically distributes the extensions without the need for the user to take any action beyond creating the master seed. In an embodiment, the cryptographic algorithm used for this purpose is Shamir's Secret Sharing Scheme (SSSS).

Embodiments of the recovery method may include multiple third parties service providers. In such embodiments, a fragment of the key may be shared between the user and each third-party service provider, a fragment is shared between the user and the system provider, and a fragment is shared between each third-party service provider and the system provider. For example, if for a given account in the multi-signature wallet there are two third-party service providers, the system 300 generates no less than five (5) fragments; one fragment (+1) between the user and the system provider, one fragment between the user and each of the two third-party service providers (+2), and one fragment between each third-party service provider and the system provider (+2). Optionally, the third-party service providers can also share a fragment between themselves, making the total number of fragments six (6). This principle can be repeated any number of times. As another example, each involved party may have three (3) extensions instead of one, making a total of 15 fragments in the former example or 18 fragments in the latter (where third-party service providers extend the secret between each other).

The minimal number of shares required to restore the key should be no less than the sum of third-party service providers on the same account multiplied by 2/S where S is the total amount of shares. Following the previous examples, it would require at least 4 out of 5 shares in the first version, or 4 out of 6 shares in the second version. For the variation with multiple extension between each participant of the system, the system 300 generates a minimum of 12 out of 15, or 15 out of 18 shares.

In another embodiment, the secret shares S can be nested, reducing the number of shares required at each level, yet allowing granularity to define multiple parties holding a secret share for a parent secret share. For example, a given share of the secret can itself be broken down in multiple sub-shares, in the same k-of-n fashion, so that k of those n sub-shares are required to recreate the share. This may prevent eventual slowdowns in secret sharing schemes, as well as minimize the management of large sets of keys on each layers as well solve incompatibility issues with some blockchains. For instance, Bitcoin-core natively supports up to 16 shares. This approach could also be leveraged to create multiple-factor authentication for the recovery mechanism itself (separated from the signing multiple-factor authentication mechanism).

In an embodiment any of the shares can be used to sum up and recover. In another embodiment of the recovery method, the system 300 specifies a minimum number of required shares to sum up and recover (for example, at least one share is required from the user).

The system 300 may include a back-up module. The back-up module is configured to implement one or more back-up mechanisms for private keys. The backup mechanisms may include multiple kinds of redundancy mechanisms, such as an agreement of trust to securely store the private key of the user with a third-party service provider.

In a particular embodiment of the back-up module, a bank (third party) may encrypt the private key of the user with a bank PIN of the user. This may add an extra layer of maintenance when the user updates the bank PIN to a new bank PIN, as the user would have to re-encrypt a copy of the key with the new bank PIN. This would not add any complexity to the operation of the system as it would only pertain to backups.

The operation and functionalities of the system 300 and methods may offer various advantages. Providing the terminal 320 as a single-application computer ensures greater security when performing a blockchain transaction since it is unlikely that the terminal 320 will be infected with malicious software if the terminal 320 is limited in its purpose, application, and functionality in accordance with the present disclosure. The single-application computer of the terminal 320 limits the attack surfaces for malware to leverage. By limiting attack surfaces, the system 300 improves security and decreases risk of compromise.

In an embodiment, the terminal 320 includes a watch-only mode. In an embodiment of the watch-only mode, the terminal 320 implements only a user interface for viewing a blockchain asset, creating permissions, and updating blockchain transactions. The terminal 320 is effectively a watch-only wallet that creates a blockchain transaction to be signed by a cold storage (offline) wallet on the cold storage device 324. The terminal 320 is configured to transmit a partially signed blockchain transaction to the system provider server 328, where the partially signed transaction can be signed by the system provider and any third-party service providers.

Various embodiments of the system 300 may limit potential security risks to sensitive user data according to various approaches. The terminal 320 may be configured to only access, via the communication network 336, a predefined system provider infrastructure/server 328, limiting the exposure and attack vectors for the terminal 320. The system 300 may limit exposure and attack vectors of the terminal through DNS restrictions, firewall rules implementation, point-to-point networks usage, or implementing a peer-to-peer approach between the terminal 320 and the system provider server 328. The terminal 320 may be configured to not store any data that may compromise the wallet. The system 300 may include restrictions on adding third party applications to the terminal 320. The restrictions may restrict the addition of third party applications to only third party applications added to the terminal 320 by and through the system provider. Such a restriction may prevent backdoors for attack created through third party applications. The system 300 may allow the user to simply create an account within the wallet for each combination of third-party service providers chosen by the user and add public keys for each of the third-party service providers, as well as the public key of the system provider. This may be done directly with the third party or via the terminal 320 of the user.

Referring now to FIG. 4, shown therein is a computer system 400 for performing a secure blockchain transaction, according to an embodiment. Computer system 400 implements the systems and methods of the present disclosure (or parts thereof). For example, computer system 400 may be used to implement methods 500 and 700 of FIGS. 5 and 7, respectively. In another example, the computer system 400 carries out various functionalities of system 300 of FIG. 3. The various components and functionalities of the computer system 400 such as modules and data may be distributed and/or reproduced across multiple components of system 300 (for example, terminal 320, cold storage device 324, system provider server 328). In some cases, a certain component and functionality of the computer system 400 may be present on multiple components of system 300.

The computer system 400 includes a processor 402 and a memory 404. Processor 402 may be processor 1020 of computer device 200. Memory 404 may be flash memory 1110 of computer device 200. Processor 402 executes the steps (or modules) of methods 500 and 700 of FIGS. 5 and 7 respectively. Memory 404 stores data received, used, and generated by methods 500, 700. Processor 402 interacts with data stored in memory 404 to execute the steps of 500, 700.

The memory 404 stores user data 408, sender data 410, recipient data 417, and mode data 411. The memory 404 may be stored at a terminal (e.g. terminal 320 of FIG. 3), a cold storage device (e.g. cold storage device 324 of FIG. 3), or a system provider server (e.g. system provider server 328 of FIG. 3).

The user data 408 includes transaction data 413. The user data 408 also includes wallet data 440 that may correspond to one or more wallets. The wallet data 440 includes one or more offline wallets stored on the cold storage device. The wallet data 440 includes account data 444 associated with one or more user accounts. The account data 444 includes key data 452 and asset data 462. The key data 452 includes private keys 458 and public keys 456. The asset data 462 may include metadata associated with the transaction (e.g. amount, asset type). The private keys 458 are stored at the memory 404 of the cold storage device.

The sender data 410 and recipient data 417 are used to generate a transaction. The recipient data 417 includes a recipient address.

The mode data 411 includes data relating to the current mode of the terminal.

The computer system 400 also includes a communication interface 406. The communication interface 406 facilitates and, in some cases, restricts or limits communication between the computer system 400 and other components of the system.

The communication interface 406 may include a network interface 414 and/or a cold storage interface 418. The network interface facilitates communication and data transfer to and from the computer system 400 via a network (for example, network 336 of FIG. 3). The cold storage interface facilitates communication and data transfer to and from a cold storage device (for example, cold storage device 324 of FIG. 3). In an embodiment, the network interface 414 may be the network communication port 380 of FIG. 3. In an embodiment, the cold storage interface 418 may be the cold storage communication port 390 of FIG. 3.

The system 400 includes a display 422 for displaying the user output and input. The display may be at the terminal (e.g., terminal 320 FIG. 3).

The processor 402 may be located at terminal (e.g. terminal 320 of FIG. 3) or at the cold storage device (e.g. cold storage device 324 of FIG. 3).

The processor includes a lockout engine 409. The lockout engine 409 is configured to implement various security features of the systems and methods of the present disclosure to keep sensitive user information (e.g. private keys 458) secure.

The lockout engine 409 may include a transaction generator module 412, a blockchain accessor module 416, a permissions updater module 420, a communications module 424, a multi-signature module 428, a multi-party recovery module 470, and a mode switching module 486.

The transaction generator module 412 creates a blockchain transaction that is to be processed and signed offline by a cold storage device (for example, cold storage device 324 of FIG. 3). The transaction generator module 412 is configured to generate an unsigned blockchain transaction from transaction input data, which includes user data 408 and recipient data 417. The input transaction data may include an amount, a receiving address, and a timestamp. The transaction input data may be input by a user via a user input device 466. The transaction generator module 412 may generate the unsigned transaction when the computer system 400 is offline.

The blockchain accessor module 416 is configured to provide the user with access, via the terminal, to blockchain technologies (e.g. blockchain computers 350 of FIG. 3) via a system provider server/infrastructure (e.g. server provider server 328 of FIG. 3). The user can view the current status of his different accounts. The user can exchange information (e.g. addresses) with other blockchain users with whom digital assets are transacted.

The permissions updater module 420 is configured to grant, transfer, and update permissions from permissions data. To change permissions, any of the entities in the trust group can request a permissions change to the service provider. The service provider signs the requested permissions change with an associated private key of the service provider. The service provider confirms the permissions change internally and makes the appropriate modification to the permissions. The permissions updater module 420 may change permissions by granting signing rights to a new entity on behalf of the requesting user, extending the entities in the trust group, removing entities in the trust group, or the like.

In an embodiment, the permissions updater module 420 provides a layer of security to the system. The user can grant permissions via the permissions updater module 420. The permissions module 420 creates a vault (associated with a user). The user accesses the vault using their own private key and a private key created for the vault. User access to the vault may further require a private key from n number of third party providers. If n>0 then at least one of the third party providers needs to be a signing party. In another embodiment, the permissions module 420 is configured to implement rules to allow for more than one additional signing party. In order for the rules regarding signing parties to be changed, both the user (private key creating the vault) and the third party must sign the changes with their respective private keys, thereby proving their identities.

The communication module 424 is configured to restrict the permitted communication of the computer system 400. The communication module 424 may restrict inbound and outbound communication. For example, the communication module 424 may prevent the computer system 400 (e.g. terminal 320 of FIG. 3) from accepting any inbound communication. The communication module 424 may also restrict outbound communication from the computer system 400 to only communications with the service provider (for example, service provider infrastructure 16 of FIG. 1) or system provider infrastructure. The communication module 424 alleviates and mitigates risks associated with the computer system 400 being connected to a communication network (e.g. network 336 of FIG. 3).

The multi-signature module 428 implements a trust group multi-signatures approach. In an embodiment, the multi-signature module 428 may reduce the threat of hacking by social engineering. In an embodiment, the multi-signature module 428 requires signature to occur successfully simultaneously at "m" end-points of the system (e.g. system 10 of FIG. 1), where m represents the minimum number of signees in the m-of-n trust relationship established for a specific account.

In an embodiment, the multi-signature approach is implemented by each device in the system (e.g. terminal 320, cold storage device 324, system provider server 328 of FIG. 3).

The multi-party recovery module 470 implements a multi-party recovery process including a user and a system provider (for example, the multi-party recovery module of system 300).

The mode switching module 486 may be configured to control or implement a switch connector (e.g. switch connector 344 of FIG. 3), or part thereof. For example, the mode switching modules 486 may control a hardware switch of the switch connector. The switch connector prevents simultaneous connection of the terminal to the network and the cold storage device. The mode switching module 486 may be configured to disable and enable components of a communication interface, such as a network communication port and a cold storage communication port (e.g. cold storage port 390 of FIG. 3). For example, the mode switching module 486 may be configured to recognize a desired mode switch (such as by receiving and processing a user input of a mode switch). The mode switching module 486 may effect the mode switch by disabling an enabled communication port and enabling a disabled communication port. In some cases, the mode switching module 486 may provide mode data to other modules of processor 402 to effect certain functionalities of the lockout engine 409.

The processor includes a cryptography engine 474. The cryptography engine 474 includes a content signing module 432 and a verification module 434. The cryptography engine 474 can be used to create and verify a digital signature.

In an embodiment, the cryptography engine 474 and the lockout engine 409 are on different devices.

The cryptography engine 474 may be configured to communicate with the lockout engine 409, and vice versa. For example, one engine may generate an output that is provided as input to the other engine. Such communication exchange between engines effects various security features of the system. In a particular case, the lockout engine 409 may generate an output indicating that the terminal is in an online mode (i.e. network-enabled) that is received by the cryptography engine. The received output may prevent the cryptography engine 474 from signing a transaction with a private key.

The content signing module 432 includes a hashing module 478 and an encryption module 480. In an embodiment, the content signing module 432 is configured to sign an unsigned transaction on the cold storage device. The signed transaction is sent to the service provider server, for example by providing the signed transaction to the blockchain accessor module 416. In an embodiment, each device in the system includes a content signing module 432.

The hashing module 478 takes data, such as transaction data 413 (e.g. an unsigned transaction) and applies a hashing function to the transaction data 413 to generate a hash value for the transaction.

The encryption module 480 uses the hash value from the hashing module 478 and the private key 458 as input data. The private key 458 is used to encrypt the hash value. The encryption module applies an encryption algorithm to the input data, generating a digitally signed transaction. The digital signature can be stored in memory 404.

The verification module 434 includes a hashing module 478 and a decryption module 482. The verification module 434 may not include the decryption module 482 on the terminal. In an embodiment, the verification module 434 is configured to verify a digital signature of a blockchain transaction (e.g. a digital signature created using content signing module 432). The verification module 434 can be used to ensure the transaction data was not changed in transit and that the sender is the owner of the data.

The decryption module 482 decrypts a digital signature (such as a digitally signed transaction). The decryption module 482 provides a public key that is associated with a private key that was used to sign the transaction and the digital signature to a decryption algorithm. The decryption module 482 outputs a first hash value via the decryption algorithm.

The hashing module 478 of the verification module 434 applies the same hashing function/algorithm as the content signing module 432 to the transaction data to generate a second hash value.

In an embodiment, the verification module 434 compares the first hash value (from the decryption module 482) to the second hash value (from the hashing module 478). If the hash values are the same, the verification module 434 verifies the transaction. If the hash values differ, the verification module 434 does not verify the transaction. Failure to verify the transaction may result in the verification module (or other module) generating a message that is sent to other entities in the system parties, alerting them that there was an unsuccessful validation of the transaction. In an embodiment, each device in the system includes a verification module 436.

The content signing module 432 and the verification module 434 help protect the integrity of the system while alerting the whole system when faulty devices are found.

The processor 402 also includes a key generation/derivation module 488. The key generation module 488 is located at the processor 402 of the terminal. The key generation module 488 may also be found in the cold storage.

The processor 402 also includes a decoding module 490. The decoding module 490 is used to view the transactions. The decoding module 490 may be located at the processor 402 of the terminal and the processor 402 of the cold storage.

In an embodiment, the processor 402 of the terminal includes the communications module 424, the multi-party recovery distribution module 470, the mode switching module 486, while the other modules of the lockout engine 409 are executed by the processor 402 of the infrastructure provider terminal/server (or cluster of term finals/servers).

Figure 5:
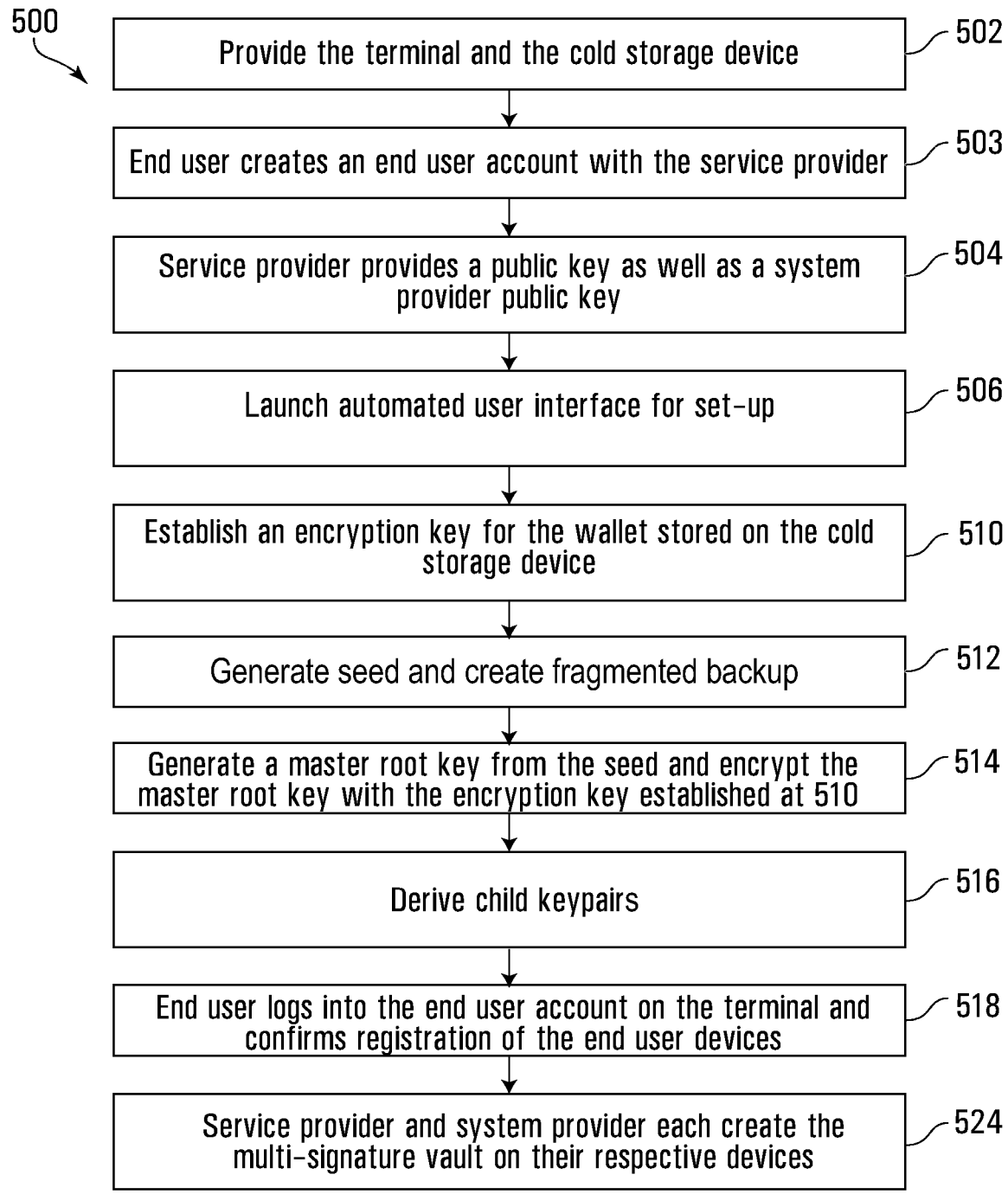
FIG. 5 is a flowchart of the set-up method of a system for performing a secure blockchain transaction of a digital asset, according to an embodiment.

Referring now to FIG. 5, shown therein is a set-up method 500 for a system of the present disclosure, according to an embodiment. The method 500, can be used to set up a system for making secure blockchain transactions (for example, system 300 of FIG. 3).

At 502, the terminal 320 and the cold storage device 324 are provided. The cold storage device 324 is a dedicated memory device (e.g., flash drive, hard drive, etc.) with some processing capabilities. An end user procures the hardware system, including the terminal 320 (and preferably the cold storage device 324) from the system provider, a service provider, or from a vendor. The procurement source may depend on the level of customization of the terminal 320 and of the cold storage device 324. The procurement source may also depend on the level of restrictions put in place by the system provider with respect to the type and origin of equipment allowed to communicate with the system provider server 328. Envisioned restrictions include anti-fraud measures, anti-money laundering compliance required for some organizations, and other compliance requirements.

The cold storage device 324 is isolated. The cold storage device 324 cannot communicate freely with the terminal 320.

At 503, the end-user creates an end-user account with the service provider.

At 504, both the service provider and system provider provide a public key. The public keys may be passed to the terminal 320 in various ways. Preferably, the public keys live within the terminal 320 even if the system provider or service provider pass keys ahead on the cold storage device 324.

At 506, upon powering up the cold storage device 324 (i.e. connecting the cold storage device 324 to the terminal 320), an automated user interface on the terminal 320 guides the user through the setup of the system 300. The setup enforces every security feature of the system 300 such that the security features are effectively put in place and followed. This can be done from the cold storage device, gathering information about the device and signing it and encrypting with a preloaded key for verification of authenticity.

Setup is complete upon disconnecting the cold storage device from the intermediary physical link by switching the switch connector 344. In another embodiment, the method is performed on a specifically crafted device that is permanently offline. In a particular example, a trusted third party such as a bank may hold on to the specifically crafted device to generate the keys with the user physically on-site.

The cold storage device 324 is optionally connected to the terminal 320 at 506. In other embodiments, the actions at 506 may be carried out with the cold storage device 324 not connected to the terminal 320.

At 510, an encryption key for the wallet stored on the cold storage device 324 is established. The encryption key for the wallet is created using an encryption algorithm. In an embodiment, the encryption algorithm is a full AES-256 encryption. A master seed is generated from which the user will be able to recover its account private key. That master seed is passed to a function to generate the master node of the tree structure for every subsequent node. In an embodiment, the function is HMAC-SHA512. This effectively allows the recovery of the wallet, as the master will deterministically derivate the same key chain as well as its associated addresses.

Also, at 510, an encryption key for data at rest is established on the cold storage device. The encryption key can be used to later encrypt the created wallet.

The encryption key may be a passphrase, a PIN (given that cold storage information was gathered and validated), biometrics, or any combination of suitable and compliant method for securing the encryption itself.

At 512, a seed is generated. The seed may have no less than 128-bit entropy. From this seed, a manipulation mechanism is established. This mechanism may take the form of a mnemonic sentence, a QR code, etc.

Also, at 512, a fragmented back-up is created. The user can select the number of fragments to safeguard (or arrange for a third party to store an encrypted copy for the user; i.e. secure storage provider/custody). The recovery follows an m of n scenario. In an embodiment, the m of n scenario respects the following requirements:

where o is the desired number of fragments for the end user;

where m is the minimal number of fragments required to recover the seed;

where n is the total number of fragments;

where p is the number of fragments stored by the service provider;

where q is the number of fragments stored by the system provider;

and o>=1 the end user owns at least one backup fragment;

and m>=2;

and m>=o+1;

and m>=n/2 more than half the generated keys must be present to recreate the backup;

and n>=o*3; →implicit n>=3;

and p>=o, q>=o the service provider and the system provider each have at least as many fragments as the end user;

and m>o, m>p, m>q neither the end user, nor the service provider, nor the system provider can recover the backup on their own.

At 514, the system 300 generates a private/public key pair belonging to the user and stores the key pair in the cold storage wallet on the cold storage device 324. In an embodiment, the derivation method for generating the key pair is selected to be compatible with one or more blockchains. In an embodiment, the BIP 32 and BIP 44 protocols could once again be an example of derivation used to be compatible with multiple blockchains.

Also, at 514, a master root key is generated. The master root key is generated from the seed. The master root key is encrypted with the encryption key established at 510.

At 516, child keypairs are derived.

Referring now to FIG. 6, shown therein is a diagram of the BIP 32 Hierarchical Deterministic (HD) wallets format protocol 600, according to an embodiment. The HD wallets format protocol 600 is carried out on a cold storage device (e.g. cold storage device 324 of FIG. 3). The BIP 32 protocol 600 is a hierarchical deterministic key creation and transfer protocol. Using the BIP 32 protocol 600, the system (for example, system 300 of FIG. 3) can create child keys from parent keys in a hierarchy.

The BIP 32 protocol 600 uses a child derivation function 604. A wallet using the BIP 32 protocol 600 (or other HD protocol) may be referred to as an HD wallet. The protocol 600 includes a seed 606, a master secret key 608, wallets/accounts 612, wallet chains 616, and addresses 620.

The HD wallet is organized as several 'accounts' 612. Accounts 612 are numbered, the default account ("") being number 0. Clients are not required to support more than one account 612—if not, they only use the default account. Each account 612 includes two keypair chains: an internal chain and an external chain. The external keychain is used to generate new public addresses. The internal keychain is used for all other operations (change addresses, generation addresses, anything that doesn't need to be communicated). Clients that do not support separate keychains for these should use the external keychain for everything. m/i/0/k corresponds to the k'th keypair of the external chain of account number i of the HD wallet derived from master m 608. m/i/1/k corresponds to the k'th keypair of the internal chain of account number i of the HD wallet derived from master m 608.

Referring back to FIG. 5, at 518 the system 300 establishes an offline wallet on the cold storage device 324. The offline wallet may be encrypted. In an embodiment, the offline wallet is an encrypted "wallet.dat" file for Bitcoin. The offline wallet includes the private key for a given wallet. and is therefore able to sign a transaction created for the wallet. In one embodiment, the offline wallet is a type of Hierarchical Deterministic wallet. For the Hierarchical Deterministic wallet, the keys are derived from a tree-based data structure, allowing the offline wallet to determine future addresses in a deterministic way. In an embodiment, the BIP32 & BIP 44 protocols can be leveraged for the creation of a HD bitcoin (or other coins) wallet. This also becomes important for a use case where a retailer/merchant needs to be able to provide addresses "just-in-time" or "on the fly" to multiple point of sales systems that may not be synchronized with one another. It also prevents these point of sale systems from requiring access to the private key. This ensures that the compromise of a point of sale system would not imply that a successful attacker would gain access to the private key controlling the spending of the merchant's wallet.

Also, at 518, the end-user logs into the end user account on the terminal (if applicable) and confirms the registration of the end user devices.

In an embodiment, the end user may complete the creation of a multi-signature vault on the terminal 320. The multi-signature vault may include a multi-signature ("m/n") wallet. The m/n wallet may be stored on the cold storage device 324. The multi-signature wallet is a wallet that requires a plurality of signatures in order for a transaction to be considered valid and ready for broadcast to the blockchain for its verification/confirmation. The multi-signature wallet may prevent unilateral action. The multi-signature wallet can be thought of as a multi-key safety deposit box in physical bank vaults where a bank employee would unlock the safety deposit box from the armature on the outside of the vault and the client would unlock the safety deposit box itself with its own key.

At 524, the service provider and system provider complete the creation of the multi-signature vault on their respective ends.

The multi-signature wallet is preferably at least a two-factor authentication (i.e. a 2-of-2 factor) wallet. The multi-signature wallet synchronizes with the system provider server 328. The system provider acts as a second required signature. The synchronization may be done via a communication mechanism such as HTTPS.

The multi-signature approach may include one or more third parties. The third party represents the $n^{th}$ signature where n>=2. A multi-signature schema having a minimum of a 2/2 factor authentication with the system provider as the second signature is required. In other embodiments, a multi-signature schema may be used for which the value of n is equal to or greater than 2. Increasing the value of n equal to or great than 2 in the multi-signature schema may depend on the number of trusted third-party service providers the end user wants to interact with via its wallet. Or the selected multi-signature schema may depend on restrictions established by the third parties (service providers?) themselves.

The multi-signature wallet guarantees to the user that the system provider cannot transfer the assets (e.g. spend the funds) in the wallet unilaterally.

The multi-signature wallet also allows the system provider to verify the validity of transaction, which can in turn accelerate validation of transactions.

The multi-signature wallet may provide for a process whereby an unsigned transaction is signed by the end user, the system provider, and the service provider on their respective devices. Accordingly, the process may include the transmission of an unsigned or partially signed transaction which is to be signed by the receiving device using a private key. The process of signing a partially signed or unsigned transaction may be performed any number of times depending on the configuration of the multi-signature wallet.

Throughout the steps of method 500, connections to and from the terminal 320 are restricted. The terminal 320 is configured to not accept any incoming connections from outside the system provider server 328. The terminal 320 is also configured to only initiate secure communication. The secure communication allows only a trusted set of servers, such as system provider server 328, to communicate with the terminal 320. The secure communication must be requested by the terminal 320. Every secure communication from the system provider server 328 to the terminal 320 is encrypted.

The integrity of the terminal 320 is challenged and verified by the system provider server 328 every time a communication is initiated by the terminal 328. In the case of a failed verification, the system provider server 328 stops communications with the terminal 320. The system provider server 328 issues an alert to any one or more of the terminal 320, the signing parties, and all parties in the multi-signing authentication. The alert indicates that the integrity of the terminal 328 could not be verified. No transaction created on the terminal 328 having an unverified integrity will be signed by the other authenticating parties. This includes the service provider and may include a third party.

Figure 7:
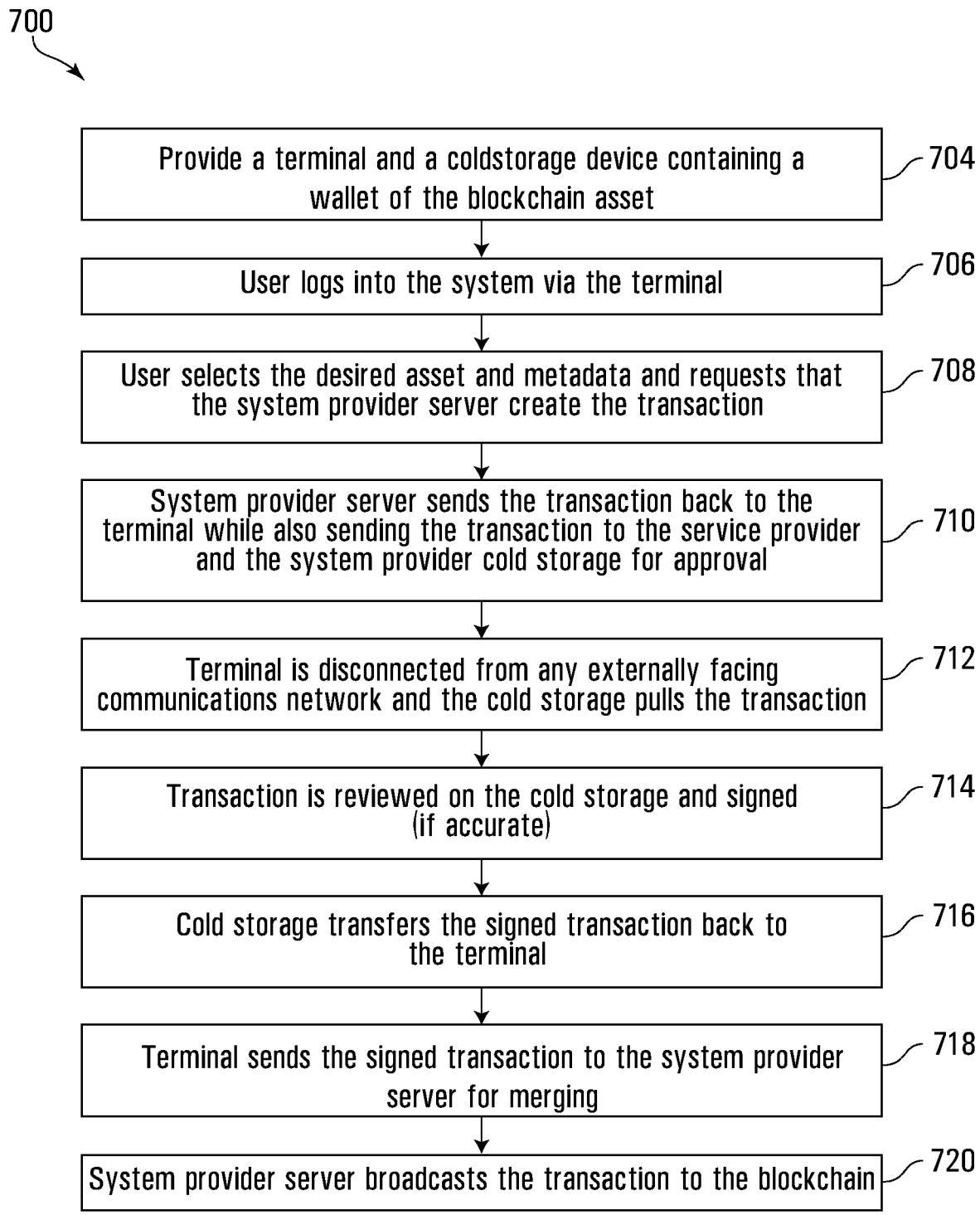
FIG. 7 is a flowchart of a method for performing a secure blockchain transaction of a digital asset, according to an embodiment.

Referring now to FIG. 7, shown therein is a method 700 for operating a system for performing a secure blockchain transaction, according to an embodiment. The method 700 can be used after having set up the system, such as by implementing protocol 600 of FIG. 6. In an embodiment, method 700 can be used to operate system 300. The method 700 can be used for securely performing a transaction of a blockchain asset over a communication network (for example, network 336 of FIG. 3).

At 704, a terminal (e.g. terminal 320 of FIG. 3) and a cold storage device (e.g. cold storage device 324 of FIG. 3) are provided. The terminal may be in a cold storage-enabled state. The terminal 320 may be offline. The terminal 320 may be logged off. The cold storage device 324 includes a wallet of the blockchain asset to be transacted. The terminal 320 and cold storage 324 are not connected at this stage.

The cold storage device 324 is isolated. The cold storage device 324 cannot communicate freely with the terminal 320.

At 706, the user logs into the system via a terminal (e.g. terminal 320), using system credentials associated with the user. The credentials may be provided to the user by the service provider or the system provider. The user may be at any point in the transaction scheme. For example, the user may be a sender, a receiver, an intermediary, a reviewer, etc.

At 708, the user selects a desired asset or assets and creates transaction metadata (e.g. recipients, amount, fee, etc.). The user then requests that the transaction be created by the system provider server.

The user of the terminal may select a transaction of the blockchain asset from the cold storage wallet. The user signs the selected transaction using the private key stored on the cold storage device. In embodiments where the system implements a multi-party authentication process, the transaction is only partially signed at this stage and requires at least one other signature from an authenticating party.

At 710, the transaction is distributed. The system provider server sends the transaction back to the terminal. The system provider also sends the transaction to the service provider for approval by the service provider. The system provider also sends the transaction to the system provider cold storage for internal approval by the system provider. The system provider server may send the transaction to the terminal, the service provider, and the system provider cold storage simultaneously.

At 712, the transaction is pulled from the terminal 320 onto the cold storage device 324. This may be performed on multiple terminals and cold storage devices.

At 714, the transaction is reviewed. The transaction may be reviewed on the cold storage to ensure that the transaction is as expected and intended. If the transaction is as expected and intended, the transaction may be signed. Otherwise, the transaction may be discarded. The transaction may be reviewed to confirm approval according to appropriate business logic of each entity. The cold storage transfers the signed transaction back to the terminal.

The system may undergo a state switch. In an embodiment, the state switch is handled by a switch connector, such as switch connector 344 of FIG. 3. The state switch includes switching the system from a cold storage state/mode to a network state/mode. The state switch may be sequential or simultaneous. The state switch includes disconnecting the terminal from the cold storage device. This may include disabling a cold storage port on the terminal. While in the cold storage state/mode, the terminal is communicatively linked to the cold storage device such that data transfer can occur.

Disconnecting the terminal from the cold storage device prevents communication/data transfer between the terminal and the cold storage device. The state switch includes connecting the terminal to the network (i.e. the terminal is online). In a sequential state switch, connecting the terminal to the network occurs after disconnecting the terminal from the cold storage device. The terminal may at this stage be disconnected from any externally facing communications network and allow the cold storage to pull the transaction.

At 716, the terminal connects to a system provider server (for example, system provider server 328 of FIG. 3) via the communication network. The terminal uploads the partially signed transaction (for example, the partially signed transaction created at 708 and signed at 714) to the system provider server 328. Having received the partially signed transaction, the system provider server requests signatures from other authenticating parties according to the multi-signature authentication process (for example, the multi-signature authentication process of method 700). The other authenticating parties include the system provider and may include one or more trusted third parties or service provider(s). The other authenticating parties (system/service provider/third party) provide a signature of the blockchain asset selected. Their respective cold storage transfers the signed transaction back to the terminal.

At 718, the terminal sends the signed transaction to the system provider server. The system provider server merges the received partially signed transaction with the partially signed transaction of the service provider and its own signature (where and when suitable). In some embodiments, the system provider server may only perform merging of the signed transactions at this stage. In some embodiments, the terminal acts as the system provider server and can complete the exchange of partially signed transactions as well as their merging operations.

The merged transaction can be locally validated at the system provider server. The local validation may be performed prior to broadcasting the transaction to the chain. The system provider may be able to confirm an arbitrary amount of time for the given transaction, against custom code of mining software, for the sole purpose of validating the outcome before the broadcast. By doing so, the system provider may reduce the risk of allowing transactions with low confirmation numbers to be marked as accepted. Knowing that this would only affect transactions within the subnetwork and that the transactions can be reprocessed at a later time if the confirmation was never reached, the risk level may be reduced. The confidence level may be such that even zero-confirmation transactions can be marked as approved, while "freezing" the received funds until confirmed by a sufficient number of nodes on the blockchain.

Other existing methods such as off-chain batching may be used. Such methods may offer lower combined delays between the time a transaction is signed and deemed approved. Such methods may help the scaling issues of slower chains where block density can now be optimized with off-chain batching, and on-chain confirmation levels reached faster for transactions pertaining to the subnetwork.

At 720, the system provider servers broadcast the transaction to the blockchain.

Various graphical interfaces will now be described. The graphical interfaces may allow a user to access and use various functionalities of the systems of the present disclosure.

Figure 8:
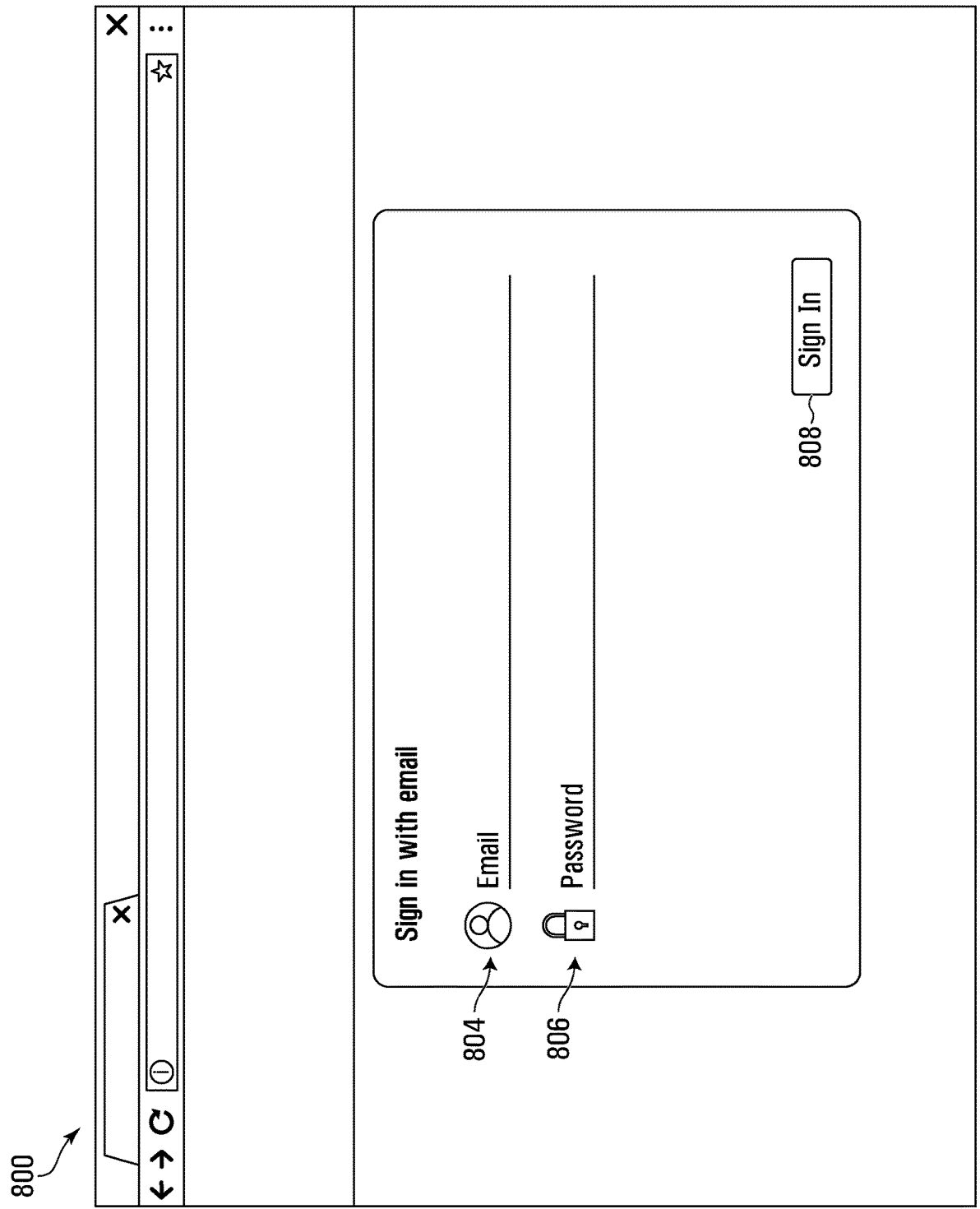
FIG. 8 shows a graphical interface of a system for performing secure blockchain transactions, according to an embodiment.

Referring now to FIG. 8, there is shown a graphical interface 800 of a login stage 802, in accordance with an embodiment. The graphical interface 800 may be presented to a user on a terminal (for example, terminal 320 of FIG. 3). The graphical user interface 800 can be used to enter and/or receive user service provider account data. The account data may be login credentials associated with a user account with the service provider. The login credentials may include an account identifier and a password. By successfully inputting the login credentials, the user may access functionality provided by one or more servers/infrastructure of the service provider. The functionality may include one or more software modules stored and executed on the terminal or on the service provider server/infrastructure accessible through the terminal via network connection. The provided functionality may be associated with a particular account. Examples of software modules providing such functionality are provided in FIG. 4.

At 804, the user can input an account identifier. For example, the user may input an email address associated with the account. At 806, the user can input a password. The password may be a combination of alphanumeric characters. At 808, the user can select the sign in functionality which causes the login information to be verified and, if verified, permits the user to access further functionality associated with the service provider account.

Figure 9:
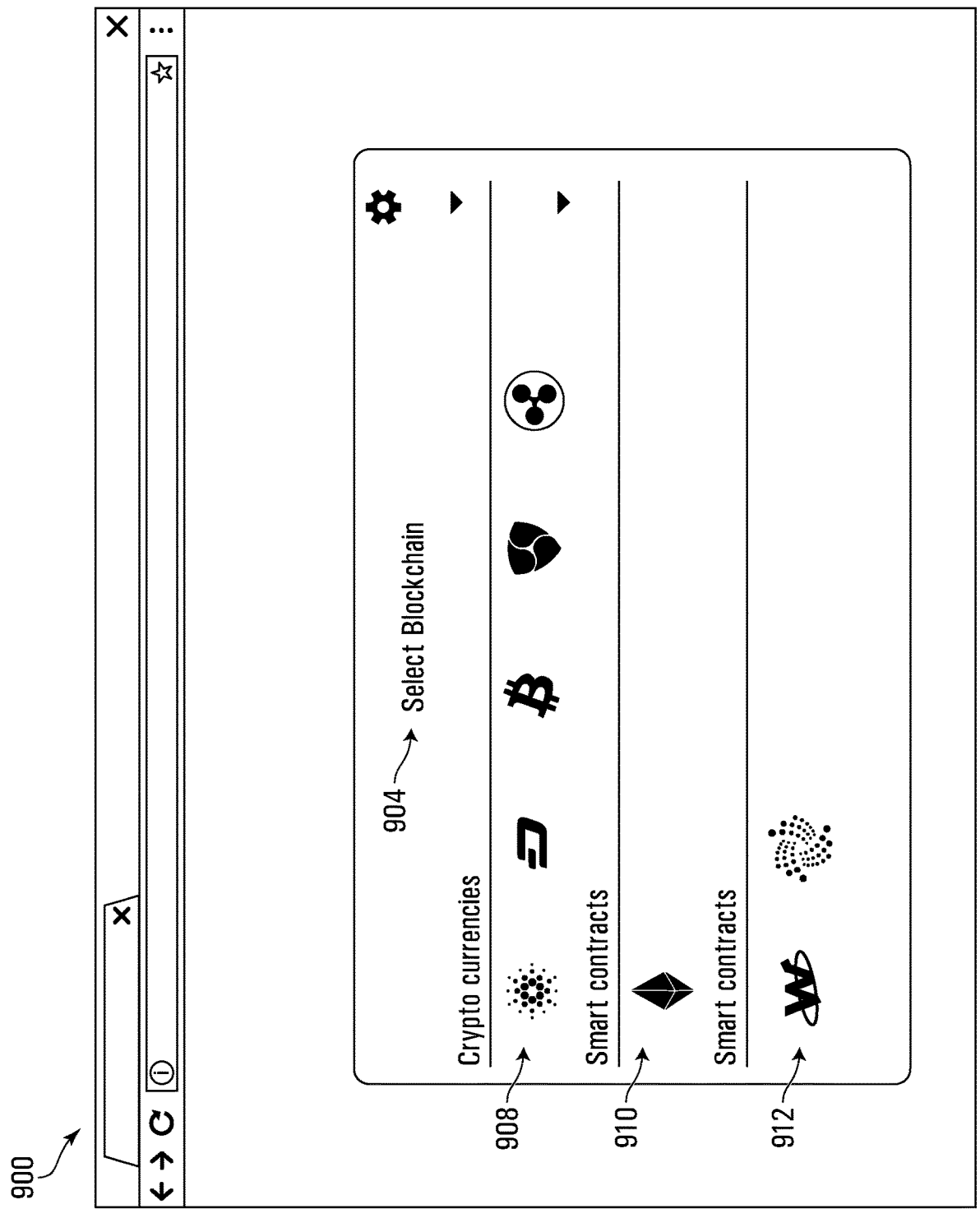
FIG. 9 shows a graphical interface of a system for performing secure blockchain transactions, according to an embodiment.

Referring now to FIG. 9, there is shown a graphical interface 900 of a blockchain selection stage, in accordance with an embodiment. The graphical interface 900 may be accessed using the systems of the present disclosure (for example, system 300 of FIG. 3) and presented to a user on a terminal (for example, terminal 320 of FIG. 3).

Using graphical user interface 900, the user can enter and/or receive blockchain system data. For example, a variety of options for blockchains 904 are presented via graphical interface 900. The user can select a particular blockchain (and associated digital asset type) to perform a transaction or other function (e.g. manage an account) using the selected blockchain. In some cases, the system presents options for selectable blockchains corresponding to blockchains with which the user has an account or has transacted previously. If this is the case, the user may be able to add additional options. In other cases, the system presents blockchain options supported by the functionality of the system provider and/or service provider.

The graphical interface 900 may divide blockchain options into groups based on a type of digital asset being transacted. For example, graphical interface 900 provides options for cryptocurrencies 908, smart contracts 910, and data 912. Blockchain options may be presented using a selectable icon, which may be a name or other identifier (for example, a logo). Via the graphical interface 900, the user can select the blockchain with which he wants to transact.

The term "smart contract" is used herein to describe computer code that can facilitate the exchange of money, content, property, shares, or anything of value. When running on the blockchain, a smart contract becomes like a self-operating computer program that automatically executes when specific conditions are met. Because smart contracts run on the blockchain, they run exactly as programmed without potential for censorship, downtime, fraud or third party interference.

Figure 10:
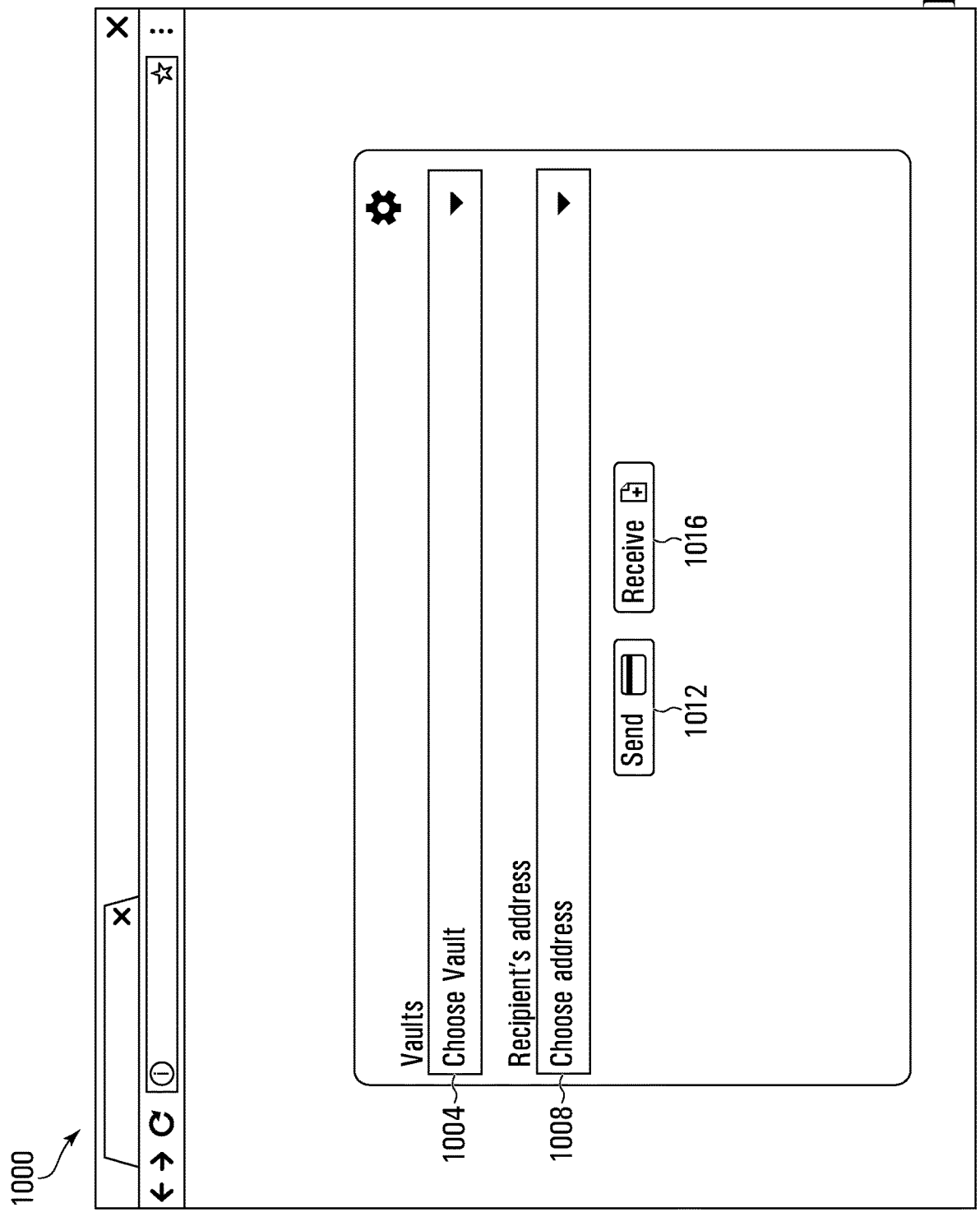
FIG. 10 shows a graphical interface of a system for performing secure blockchain transactions, according to an embodiment.

Referring now to FIG. 10, there is shown a graphical interface 1000, according to an embodiment. The graphical interface 1000 may be accessed using the systems of the present disclosure (for example, system 300 of FIG. 3) and presented to a user on a terminal (for example, terminal 320 of FIG. 3).

Using the graphical interface 1000, the user can select a vault 1004. The vault may also be referred to as a wallet, address, or recipient account, and it is understood that such terms are used interchangeably in the present disclosure. The vault may be associated with an account of the user. In some cases, there may be a plurality of vaults associated with the user account. The graphical interface 1000 may present the vaults associated with the user account as a list, such as via a dropdown list. The user can also select or enter a recipient address 1008. The recipient address may include an intended recipient of a digital asset via blockchain transaction. In some cases, the system may store previous recipients associated with the user account and provide them in list form.

Having selected or inputted transaction information including a vault and a recipient address, the user can select a send option 1012 or a receive option 1016. Depending on the selected option, the selected or inputted transaction information can be used to generate a proposed transaction.

Graphical interface 1000 also includes an option to view previous transactions stored 1020 and associated with the user account. Previous transactions may be accessed and viewed by selecting a transaction history icon or tab, which upon selection may present the previous transaction information within graphical interface 1000, as a pop-up type window, or as a separate graphical interface.

Figure 11:
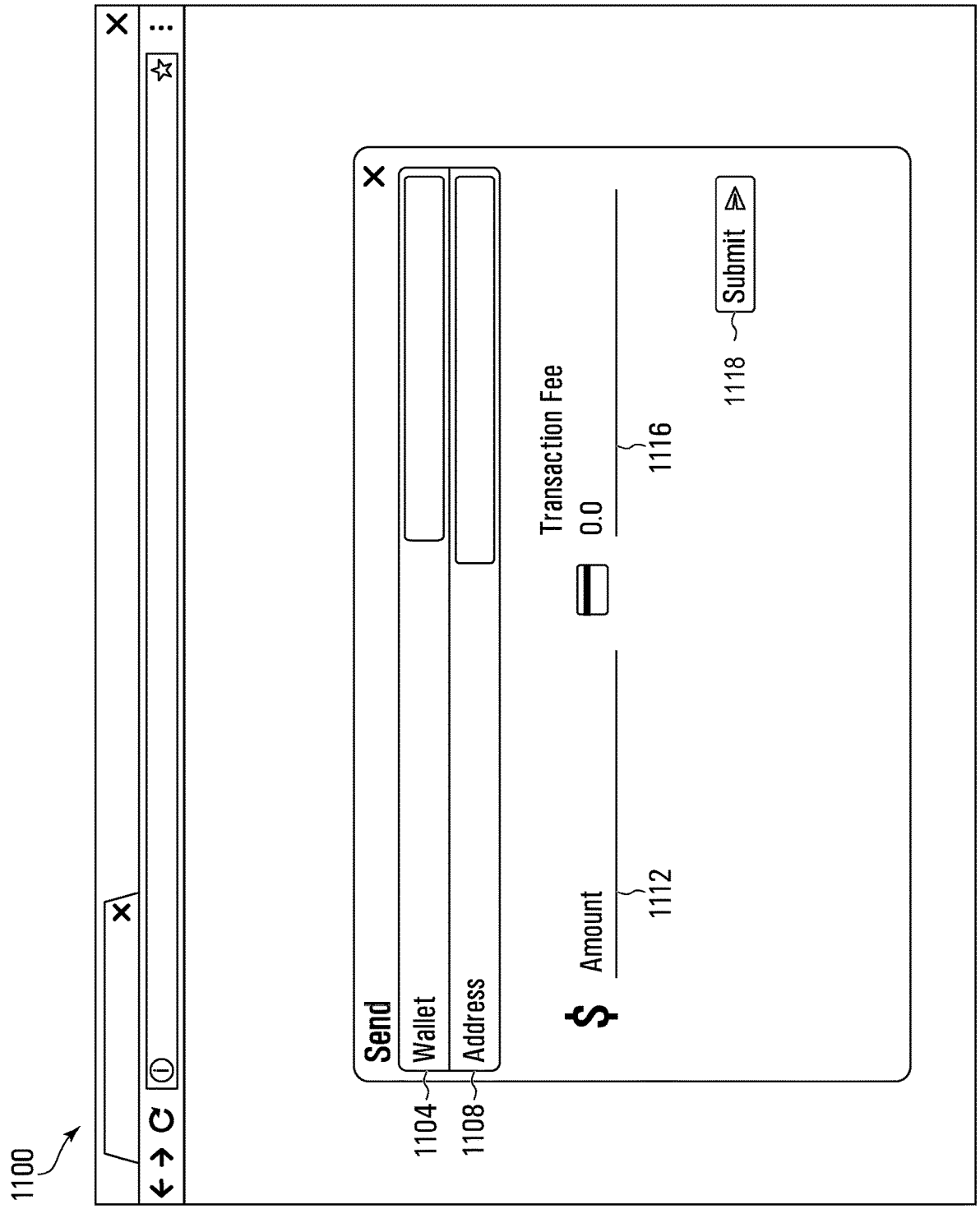
FIG. 11 is a graphical interface of a system for performing secure blockchain transactions, according to an embodiment.

Referring now to FIG. 11, there is shown a graphical interface 1100, according to an embodiment. The graphical interface 1100 may be accessed using the systems of the present disclosure (for example, system 300 of FIG. 3) and presented to a user on a terminal (for example, terminal 320 of FIG. 3).

Using the graphical interface 1100, the user can submit a blockchain transaction wherein the user is transferring a digital asset to a recipient (i.e. a "send" operation).

The graphical interface 1100 includes a wallet 1104. The wallet 1104 is a wallet associated with the user account, and potentially with a vault associated with the user account. Where the user account includes a plurality of wallets, the user may select a particular wallet 1104 from which to transact. The wallet includes an address 1108. In some cases, the wallet 1104 may include multiple addresses from which the user can choose. The address may represent a public key of an asymmetric key pair. Wallet 1104 and address 1108 information may be inputted or selected by the user depending on the configuration.

The user can input a transaction amount into an amount box 1112. Upon inputting an amount 1112, the system may automatically calculate and display a transaction fee 1116 for the proposed transaction.

Once the transaction information is complete and acceptable to the user, the user can submit the transaction by selecting a submit icon 1118.

Referring now to FIG. 12, there is shown a graphical interface 1200, according to an embodiment. The graphical interface 1200 may be accessed using the systems of the present disclosure (for example, system 300 of FIG. 3) and presented to a user on a terminal (for example, terminal 320 of FIG. 3).

Using the graphical interface 1200, the user can create an invoice 1204 for a blockchain transaction created using the system (for example, the transaction created via graphical interface 1100 of FIG. 11). The graphical interface 1200 includes a payee/recipient address 1208, which displays the recipient address for the transaction. The graphical interface 1200 includes payer's account information 1212. Payer's account information 1212 may display a transaction amount 1216, a transaction fee amount 1218, and a total transaction amount 1224. Upon verifying the displayed transaction information 1208, 1212, 1216, 1218, the user can select a submit function 1228 to generate the invoice for the transaction.

Figure 13:
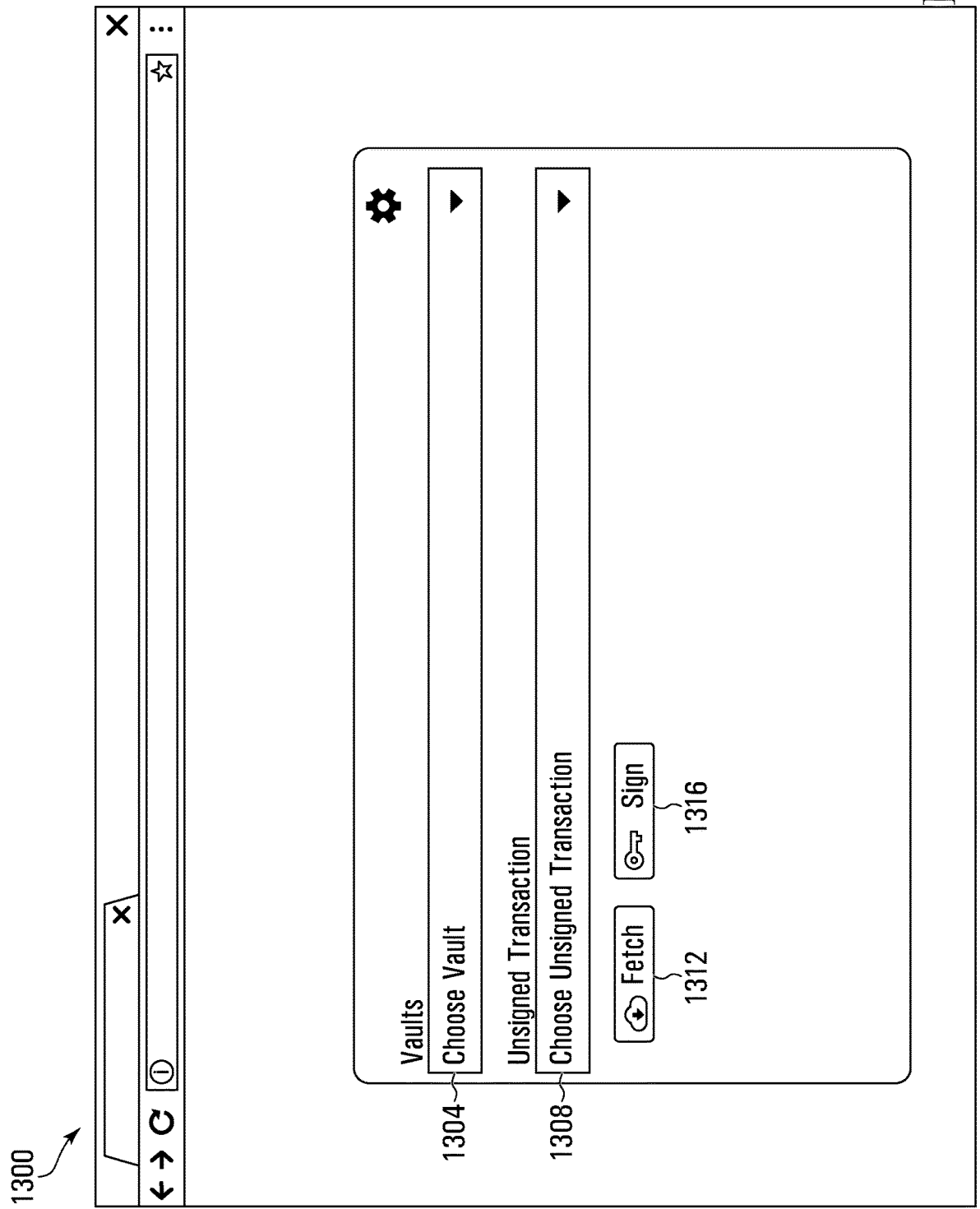
FIG. 13 is a graphical interface of a system for performing secure blockchain transactions, according to an embodiment.

Referring now to FIG. 13, there is shown a graphical interface 1300, in accordance with an embodiment. The graphical interface 1300 may be accessed using the systems of the present disclosure (for example, system 300 of FIG. 3) and presented to a user on a terminal (for example, terminal 320 of FIG. 3).

Using the graphical interface 1300, the user can fetch a key for signing a transaction and sign the transaction using the key. The user can select a vault 1304 from one or more vaults associated with an account of the user.

The user can select an unsigned transaction 1308 from one or more unsigned transactions associated with the user account. An unsigned transaction may be given an identifier when stored in the system so that the unsigned transaction is displayed, for the user to potentially select, via the identifier.

Having selected a vault 1304 and an unsigned transaction 1308, the user can select a fetch option 1312, wherein the system retrieves the key for signing. Once the key is fetched, the user can select a sign option 1316. Upon the user selecting the sign option, the system uses the key to sign the previously unsigned transaction, generating a signed transaction (or partially signed transaction, as the case may be).

Figure 14:
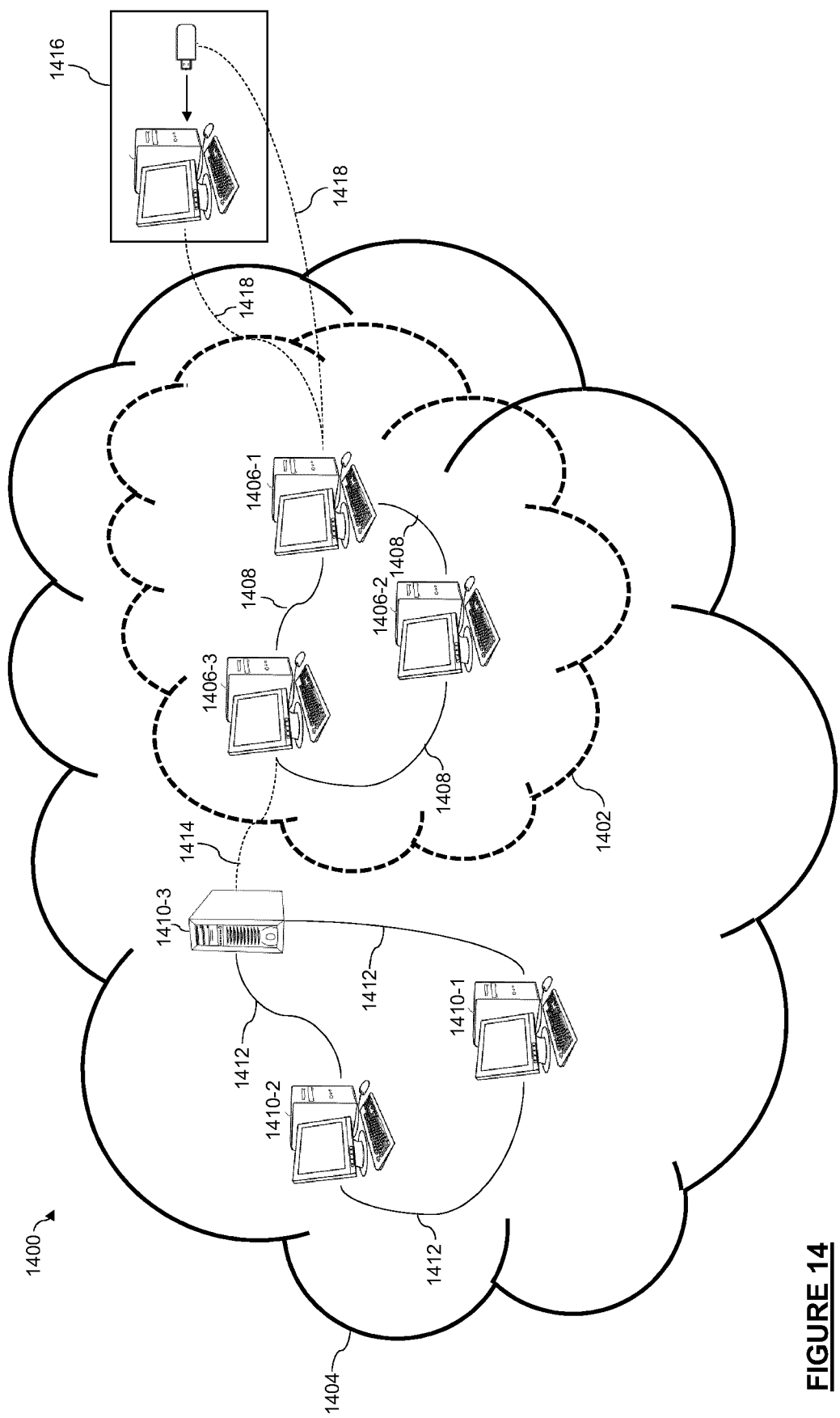
FIG. 14 is a block diagram of a system for making a secure blockchain transaction according to an existing method.

Referring now to FIG. 14, shown therein is a block diagram of a system 1400. System 1400 illustrates an exemplary approach to making a secure blockchain transaction using existing methods.

The system 1400 includes a blockchain network 1402. The blockchain network 1402 may be a Bitcoin blockchain mainnet. The blockchain network 1402 operates within a broader network 1404. The broader network 1404 may be the Internet. The broader network 1404 may be public or private.

The blockchain network 1402 illustrates the limits of the blockchain containing its devices and typical network connections. The blockchain network 1402 includes a plurality of blockchain devices 1406-1, 1406-2, and 1406-3. The blockchain devices 1406-1, 1406-2, 1406-3 are connected via network connection 1408.

The broader network 1404 includes a plurality of network devices 1410-1, 1410-2, and 1410-3. The network devices 1410-1, 1410-2, 1410-3 are connected via network connection 1412.

The blockchain devices 1406-1, 1406-2, 1406-3 and network devices 1410-1, 1410-2, 1410-3 may be different types of devices.

One or more of the network devices may be interconnected with one or more blockchain devices. For example, network device 1410-3 may be connected to blockchain device 1406-03 via a cross-network connection 1414.

The system 1400 includes a cold storage device 1416. The cold storage device 1416 is associated with a user. The cold storage device 1416 resides outside the network 1404 and the blockchain network 1402. The cold storage device 1416 is connected to blockchain device 1406-1. The connection includes a physical connection 1418 (i.e. not just logical connection).

Figure 15:
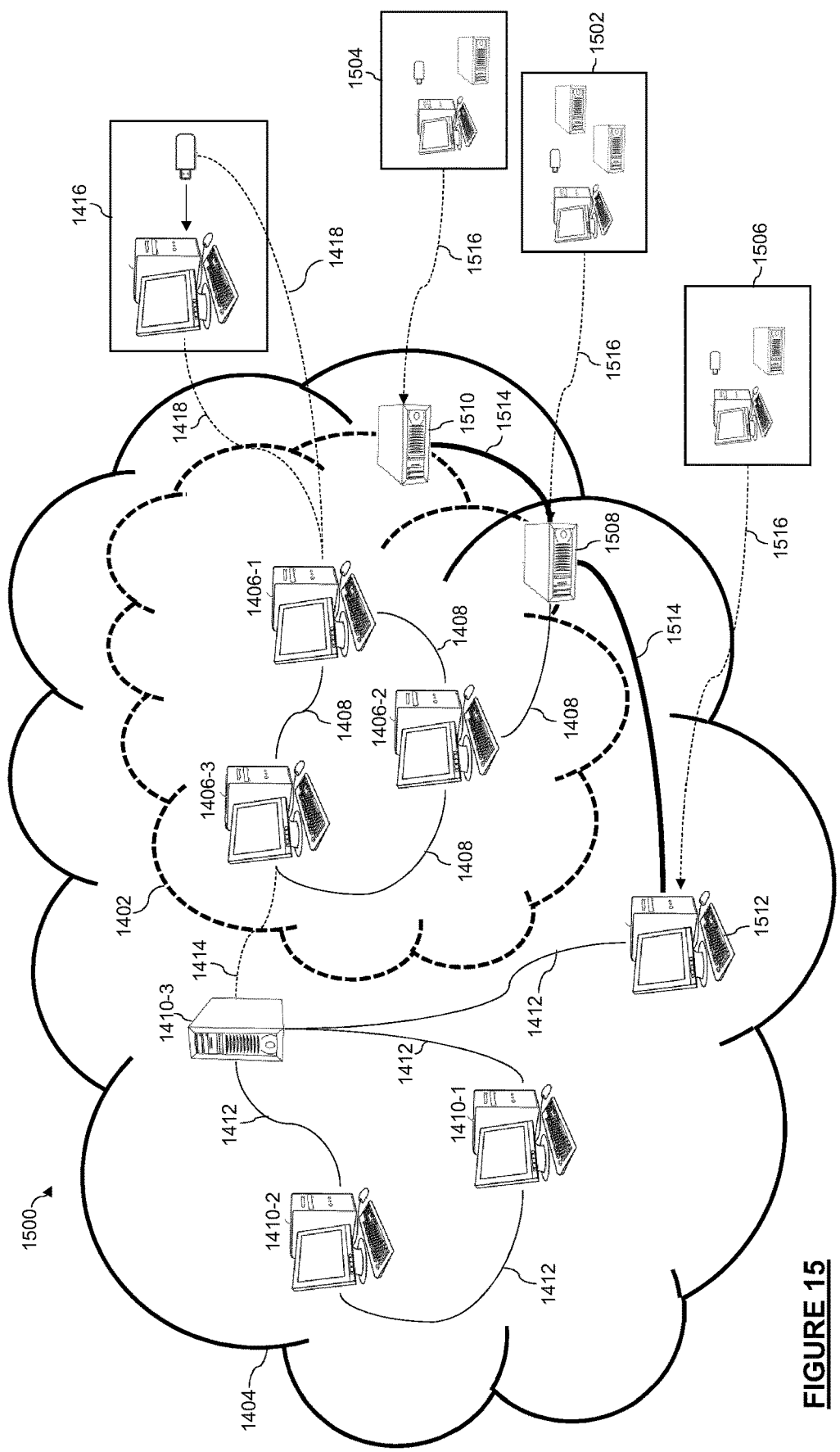
FIG. 15 is a block diagram of a subnetwork system for performing a secure blockchain transaction, according to an embodiment.

Referring now to FIG. 15, shown therein is a block diagram of a subnetwork system 1500, according to an embodiment. Advantageously, the subnetwork system 1500 can be established on top of the system 1400 using the infrastructure and components shown in FIG. 14 to provide improved security for blockchain transactions.

The system 1500 includes a system provider (also sometimes referred to a "network operator"), a service provider, and an end user.

The system 1500 includes a network operator cold storage device 1502, a service provider cold storage device 1504, and an end user cold storage device 1506. The cold storage devices 1502, 1504, 1506 are associated with the network operator, service provider, and end user, respectively.

The cold storage devices 1502, 1504, 1506 may be any form of device with computing capabilities. In an embodiment, the network cold storage device 1502 is a server or cluster of servers.

The cold storage devices 1502, 1504, 1506 sit outside any externally-facing network.

The cold storage devices 1502, 1504, 1506 include a physical means of exchanging data. The cold storage devices 1502, 1504, 1506 are configured to allow outbound connections/pairings only. The cold storage devices 1502, 1504, 1506 are configured to initiate the process of data exchange and refuse any incoming connections or pairings.

The system 1500 is configured to prevent the network operator or service provider from having a wallet storage on a device that is connected to the broader network 1404.

The system 1500 includes a network operator terminal device 1508, a service provider terminal 1510, and an end user terminal 1512. The service provider terminal 1510 and end user terminal 1512 are each connected to the network operator terminal 1508 via a secure connection 1514. The network operator terminal 1508, service provider terminal 1510, and end user terminal 1512 are each connected to their respective cold storage. The end user terminal 1512 sits in the broader network 1404 and is connected to the network device 1410-3 via network connection 1412.

The network operator terminal 1508 may be any form of computing device. In an embodiment, the network operator terminal 1508 device is a server or cluster of servers. The network operator terminal 1508 is responsible for exchanging data with the network operator.

The network operator terminal 1508 may exchange data with the service provider terminal 1510 and the end user terminal 1512. For example, an unsigned transaction may be created on the network operator terminal 1508 before the unsigned transaction is sent to the appropriate parties (i.e. service provider terminal 1510 and/or end user terminal 1512) for signing.

The network operator terminal 1508 is shown positioned midway between the blockchain network 1402 and the broader network 1404. In some cases, the network operator terminal 1508 may be directly in the blockchain network 1402 (i.e. acting as a node). In cases where the network operator terminal 1508 is not in the blockchain network 1404, the network operator terminal 1508 can still connect (directly or indirectly) to a node of the blockchain network 1402 to perform an action such as broadcasting a transaction or to querying/exploring the blockchain.

In an embodiment, the end user decides to use a device to store keys that is connected to the broader network 1404. In such a case, the end user cold storage device 1506 and end user terminal 1512 should be seen as one device in the broader network 1404.

The service provider terminal 1510 may sit in the blockchain network 1402 or on the broader network 1404. The service provider terminal 1510 may be connected to both the blockchain network 1402 and the broader network 1404. Whether the service provider terminal 1510 sits in the blockchain network 1402, on the broader network 1404, or is connected to both networks 1402, 1404 may be up to the service provider. For example, the service provider may want to perform its own analytical processing of a blockchain to improve its decision making of requested transactions. In another example, the service provider may rely solely on the information available on the network operator terminal 1508.

In another embodiment, the service provider terminal 1510 may be isolated from the broader network 1404 and connected via a private network to a second layer of sub-network operator terminal.

The different scenarios may coexist within the limits of the network operator as the network operator has at least one network operator cold storage device 1502 and one network operator terminal 1508, while allowing the addition of extra layers, if required. The extra layers may be segregated from one another. The decision of a particular end user to adopt the recommended isolated cold storage of the wallet and terminal combination also has no impact on the ability of other end users to decide for themselves.

Figure 16:
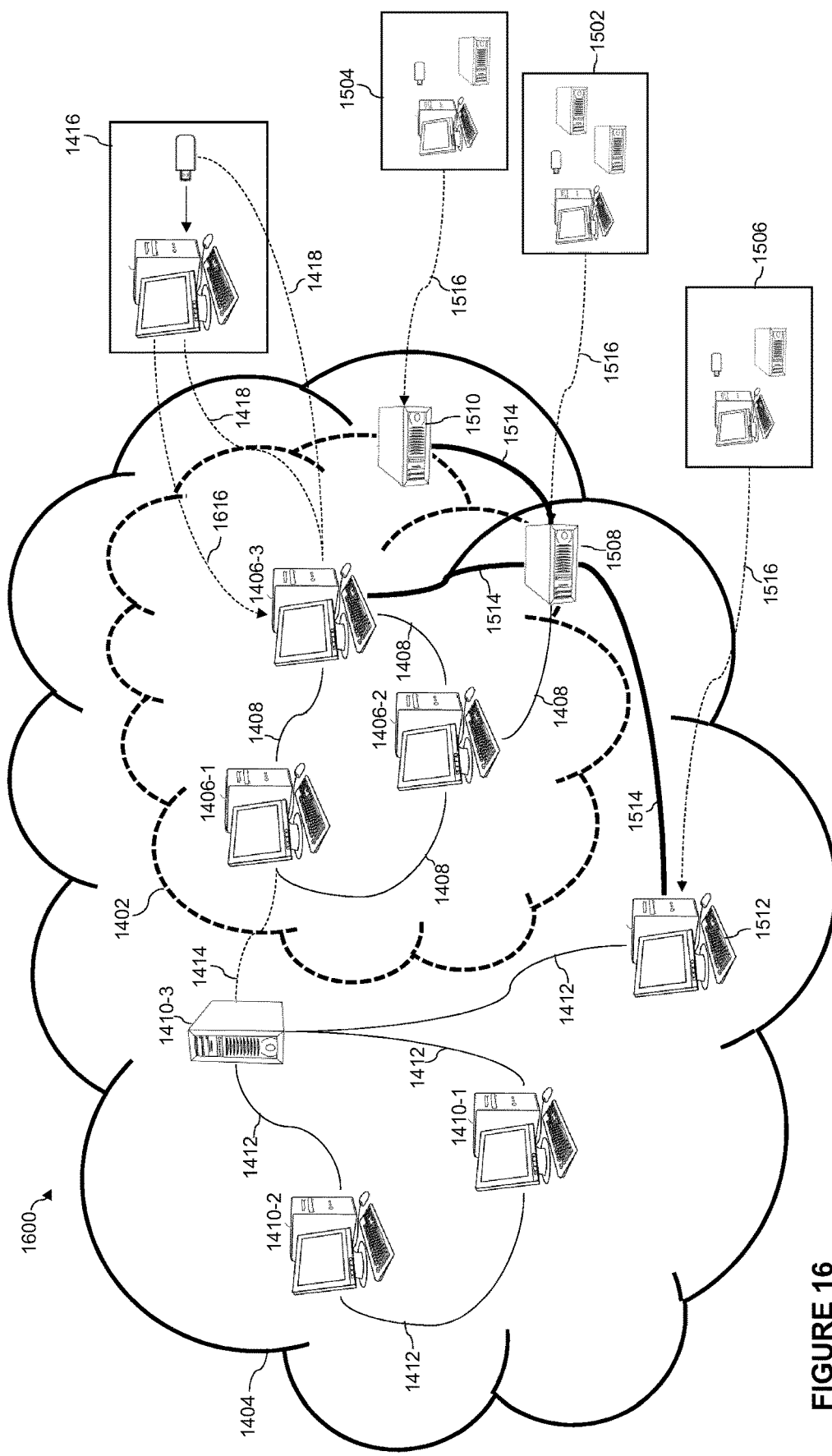
FIG. 16 is a block diagram of a subnetwork system for performing a secure blockchain transaction, according to another embodiment.

As illustrated in FIG. 16, in another embodiment, the subnetwork operator may allow an end user using a wallet management solution of the end user's choice into the subnetwork 1500.

For example, as shown in FIG. 16, the blockchain device 1406-3 is allowed into the subnetwork. The user of the blockchain device 1406-3 (and the cold storage device 1416) becomes an end user of the subnetwork system 1500.

The subnetwork operator allows the blockchain device 1406-3 to join the subnetwork if the end user associated with the blockchain device 1406-3 can meet the minimal requirements established by the subnetwork operator. The minimum requirements may include one or more of establishing a relationship with the service provider, having a standardized and compatible wallet, being multi-signature capable, being fragmented backup capable, having the potential to send fragmented backups securely to the subnetwork operator and the service provider, etc.

The transactions processed by the subnetwork system 1500 may take various paths. The paths may include a default path/behavior and one or more variations on the default path/behavior.

The managed subnetwork 1500 includes external operations, internal operations, inbound operations, and outbound operations. Each type of operation may have a particular treatment given to it by the system 1500 or may be managed by the system 1500 in a particular way.

The system 1500 may include a default behavior for the operations as follows:

The external operations include operations between two users outside of the managed subnetwork 1500. The external operations are not affected by the existence of the managed subnetwork. This allows the subnetwork manager to operate without any additional modification to the available blockchains or the need to create a new one. Any user wanting to operate outside the managed subnetwork 1500 can still do so.

The internal operations include operations between two internal users (from the perspective of the managed subnetwork 1500). The internal operations can be approved as any other blockchain transactions, but with a high level of confidence as the subnetwork manager is aware of the status on each end of the transactions. The operations may be approved in near real-time using a confirmations process enhancement technology for the managed blockchain subnetwork 1500. The approval may be conditional. For example, the approval may be conditional on the condition that no 51% attack is taking place at that time.

The inbound operations include operations from an external wallet (from the perspective of the managed subnetwork 1500) to an internal wallet. The inbound operation may be permitted by the system 1500 but may be delayed for further verification (e.g. AML, source of revenue, anti-fraud, 51% attack etc.).

The outbound operations include operations from an internal wallet to an external wallet (from the perspective of the managed subnetwork 1500). The outbound operations may be blocked by the subnetwork manager. Blocking the outbound operations may be implemented to prevent theft, fraud, money laundering, mistakes, or other unwanted behaviours to exfiltrate resources out of the managed subnetwork 1500.

Network communication connections 1514, 1516, and 1616, and devices 1502, 1504, and 1506 illustrate the system provider subnetwork.

Network connections 1414, 1418, 1516, and 1616 illustrate cross-domain communication.

In an embodiment, any one or more of network connections 1408, 1412, and 1514 may be point-to-point, tunneled, LAN, vLAN, inter-domain connections. It is understood that this represents merely one example type of network connection for network connections 1408, 1412, and 1514, and is not restrictive. Other network connections are contemplated.

Cold storage device 1416 is connected to blockchain device 1406-3 via network connection 1616. The network connection 1616 is a different pathway to the subnetwork from network connection 1516.

Figure 17:
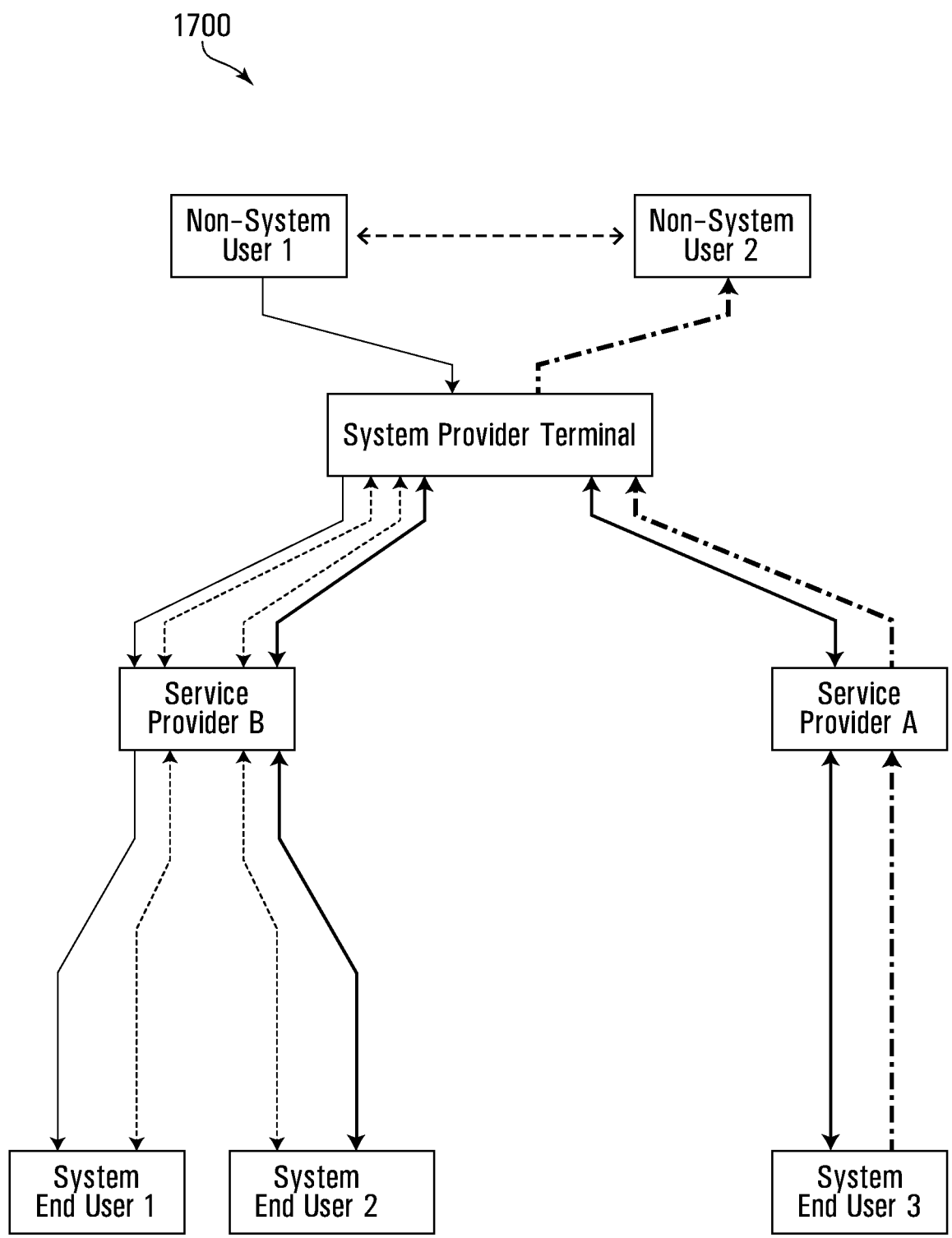
FIG. 17 is a block diagram of a variation of a default behaviour for managing operations by the subnetwork system of FIGS. 15 and 16, according to an embodiment.

Referring now to FIG. 17, shown therein is a variation 1700 on the default behavior of the of the subnetwork system 1500, according to an embodiment.

In the variation 1700, certain outbound operations may be permitted by the system 1500. The outbound operations may be allowed after a delay in specific cases, such as a pre-cleared or approved recipient, or an approved separate managed subnetwork. The outbound operations may be allowed if new technology advancements provide for compliance and/or security. Outbound operations may be subject to the system provider controls (e.g. regulatory, compliance, anti-money laundering, etc.).

Figure 18:
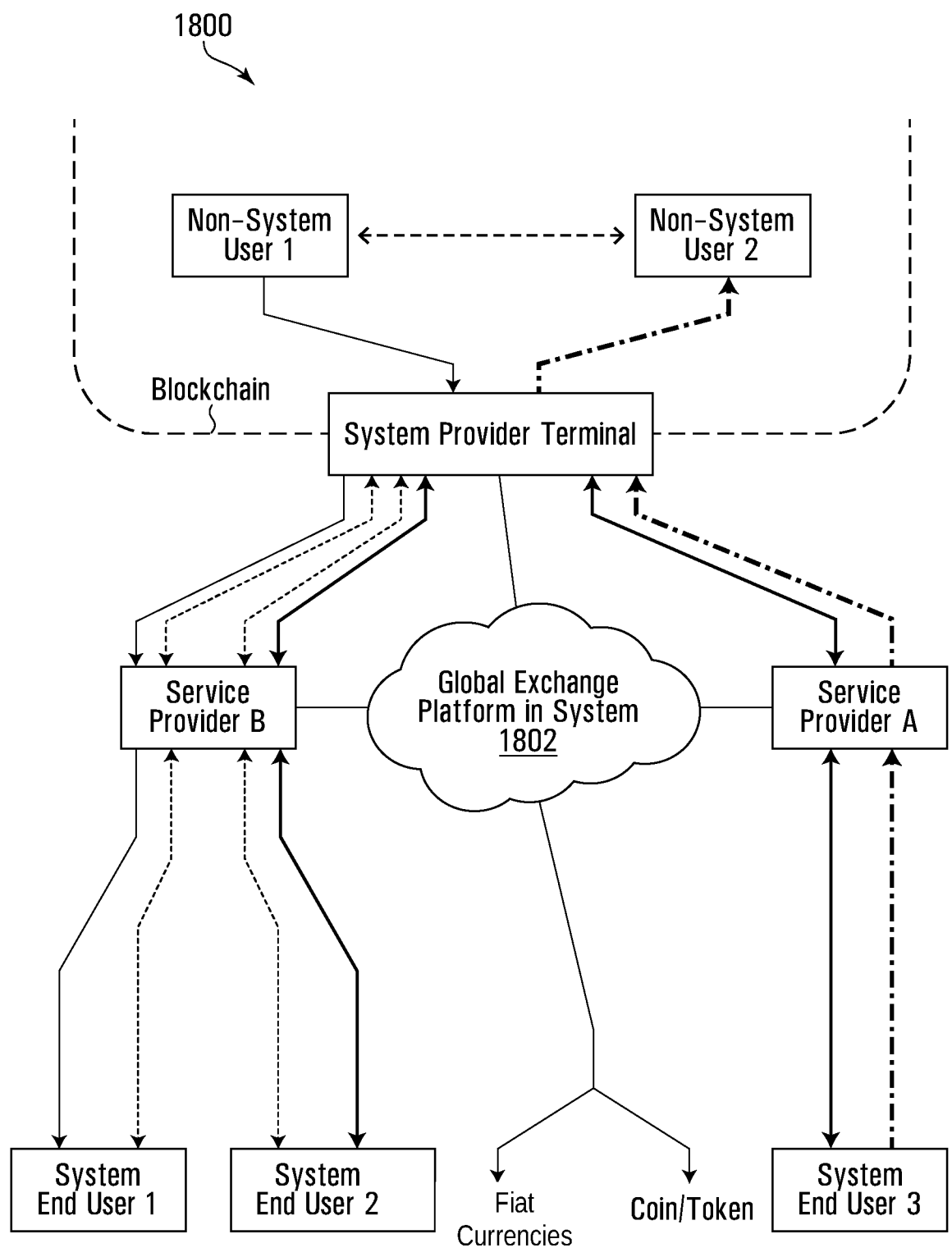
FIG. 18 is a block diagram of another variation of the default behaviour for managing operations by the subnetwork system of FIGS. 15 and 16 including a brokerage, according to an embodiment.

Referring now to FIG. 18, shown therein is another variation 1800 on the default behavior of the subnetwork system 1500, according to an embodiment.

The system 1500 may include a strict outbound operations policy, as described in reference to the default behavior. In order to compensate for the strict outbound operation policy, the system 1500 may include a brokerage or exchange of resources 1802. The brokerage 1802 is internal to the managed subnetwork 1500 and global within the managed subnetwork 1500.

The brokerage 1802 may allow end users to access brokerage- or exchange-type services within the managed subnetwork 1500. The end users may be able to do so while tied to their relationship with the service provider.

In an example, the service provider is a hospital and the brokerage 1802 allows for check-in/out of the personal medical record of the end user.

In another example, the service provider is a bank and the exchange 1802 allows for fiat-coin exchange directly from a user account to a wallet of the end user.

In another example, the service provider is a real estate authority, regulator, or agent. The real estate actor may be able to provide all titles and related documents to the end user's owned properties, etc. via the brokerage 1802.

While the above description provides examples of one or more apparatus, methods, or systems, it will be appreciated that other apparatus, methods, or systems may be within the scope of the claims as interpreted by one of skill in the art.

The invention claimed is:

1. A system for performing a secure blockchain transaction, the system comprising:
   a terminal for generating the blockchain transaction, the terminal configured to operate in a first mode and a second mode; and
   a switch connector for preventing the terminal from operating in the first mode and the second mode simultaneously;
   wherein, when the terminal is in the first mode, the terminal is connected via a network to a system provider server, the system provider server in communication with at least one blockchain device;
   wherein, when the terminal is in the second mode, the terminal is in communication with a cold storage device;
   wherein the cold storage device is configured to store a private key for signing the blockchain transaction;
   wherein the terminal is configured to allow the blockchain transaction to be signed on the cold storage device using the private key;
   wherein each of a user of the terminal, a system provider providing the system provider server, and a service provider store a fragment of back-up information for backing up private blockchain information;
   wherein the private blockchain information is recoverable only when at least two fragments of the back-up information are provided.

2. The system of claim 1, wherein the switch connector comprises a hardware switch.

3. The system of claim 1, wherein the switch connector comprises a software switch.

4. The system of claim 1, wherein the blockchain transaction is signed by at least two parties prior to sending the signed blockchain transaction to the at least one blockchain device.

5. The system of claim 4, wherein the at least one other party includes the system provider.

6. The system of claim 1, wherein the system provider server is in communication with at least one service provider device.

7. The system of claim 1, wherein the back-up information is a key.

8. The system of claim 1, wherein the private blockchain information includes the private key.

9. A terminal for performing a secure blockchain transaction, the terminal comprising:
   a processor for generating an unsigned blockchain transaction;
   a cold storage communication port for transmitting the unsigned blockchain transaction to a cold storage device, wherein the cold storage device stores a private key for signing the unsigned blockchain transaction, and wherein the terminal receives a signed blockchain transaction from the cold storage device;
   a network communication port for transmitting the signed blockchain transaction to a system provider server over a network, wherein the system provider server is in communication with at least one blockchain device;
   a switch connector for selectively disabling either the cold storage communication port or the network communication port such that the private key is not exposed to the network;
   wherein each of a user of the terminal, a system provider providing the system provider server, and a service provider store a fragment of back-up information for backing up private blockchain information;
   wherein the private blockchain information is recoverable only when at least two fragments of the back-up information are provided.

10. The terminal of claim 9, wherein the switch connector comprises a hardware switch.

11. The terminal of claim 9, wherein the switch connector comprises a software switch.

12. The terminal of claim 9 further configured to restrict inbound and outbound communication with the system provider server.

13. A cold storage device for performing a secure blockchain transaction of a digital asset over a network, the cold storage device comprising:
   a memory storing a private key of at least one cold storage wallet, the private key for signing an unsigned blockchain transaction;
   a communication interface for receiving an unsigned blockchain transaction from a terminal, the terminal disconnected from the network; and wherein the communication interface transmits a signed blockchain transaction to the terminal, the terminal disconnected from the network;
   a connection to a processor configured to sign the unsigned blockchain transaction using the private key;
   wherein each of a user of the terminal, a system provider, and a service provider store a fragment of back-up information for backing up private blockchain information;
   wherein the private blockchain information is recoverable only when at least two fragments of the back-up information are provided.

14. The device of claim 13, wherein the communication interface uses at least one communication mechanism selected from the group consisting of encrypted Bluetooth, near-field communication, Wi-Fi, optical communication, wired communication, and thermal emission.

15. The device of claim 13, wherein the processor is further configured to generate a key pair of the at least one cold storage wallet.

16. The device of claim 15, wherein the at least one cold storage wallet is a hierarchical deterministic wallet.

17. A method of performing a secure blockchain transaction over a communication network, the method comprising:
generating an unsigned blockchain transaction using a terminal, the terminal having an online mode and an offline mode;
transmitting, in the offline mode, the unsigned blockchain transaction from the terminal to a cold storage device, the cold storage device storing a private key for signing the unsigned blockchain transaction;
signing the unsigned blockchain transaction on the cold storage device using the private key;
transmitting the signed blockchain transaction from the cold storage device to the terminal;
switching the terminal from the offline mode to the online mode;
transmitting the signed blockchain transaction from the terminal to a system provider server via the communication network while in the online mode, the system provider server in communication with a plurality of blockchain computers;
wherein each of a user of the terminal, a system provider providing the system provider server, and a service provider store a fragment of back-up information for backing up private blockchain information;
wherein the private blockchain information is recoverable only when at least two fragments of the back-up information are provided.

18. The method of claim 17, further comprising signing the transmitted signed transaction with a second private key according to a multi-signature authentication process.

19. The method of claim 18, wherein signing the transmitted signed transaction is performed on the system provider server.

20. The method of claim 17, wherein the switching is performed using a switch connector.

21. The method of claim 20, wherein the switch connector is a hardware switch connector.

22. The method of claim 20, wherein the switch connector is a software switch connector.

* * * * *